US009044711B2

(12) United States Patent
McGinnis

(10) Patent No.: US 9,044,711 B2
(45) Date of Patent: Jun. 2, 2015

(54) OSMOTICALLY DRIVEN MEMBRANE PROCESSES AND SYSTEMS AND METHODS FOR DRAW SOLUTE RECOVERY

(75) Inventor: Robert L. McGinnis, Coventry, CT (US)

(73) Assignee: OASYS WATER, INC., Boston, MA (US)

(*) Notice: Subject to any disclaimer, the term of this patent is extended or adjusted under 35 U.S.C. 154(b) by 855 days.

(21) Appl. No.: 13/238,789

(22) Filed: Sep. 21, 2011

(65) Prior Publication Data

US 2012/0067819 A1    Mar. 22, 2012

Related U.S. Application Data

(63) Continuation-in-part of application No. PCT/US2010/054512, filed on Oct. 28, 2010.

(60) Provisional application No. 61/255,734, filed on Oct. 28, 2009, provisional application No. 61/385,296, filed on Sep. 22, 2010.

(51) Int. Cl.
| | |
|---|---|
| *B01D 61/00* | (2006.01) |
| *B01D 3/00* | (2006.01) |
| *B01D 3/14* | (2006.01) |

(52) U.S. Cl.
CPC ............ *B01D 61/002* (2013.01); *B01D 3/145* (2013.01); *B01D 2311/2626* (2013.01); *B01D 2311/2649* (2013.01); *B01D 2311/2669* (2013.01)

(58) Field of Classification Search
None
See application file for complete search history.

(56) References Cited

U.S. PATENT DOCUMENTS

| | | |
|---|---|---|
| 3,130,156 A | 4/1964 | Neff |
| 3,470,093 A | 9/1969 | Johanson |
| 3,532,621 A | 10/1970 | Hough |
| 3,562,116 A | 2/1971 | Rodgers |
| 3,562,152 A | 2/1971 | Davison |
| 3,617,547 A | 11/1971 | Halff et al. |
| 3,649,467 A | 3/1972 | Winsel et al. |
| 3,721,621 A | 3/1973 | Hough |

(Continued)

FOREIGN PATENT DOCUMENTS

| | | |
|---|---|---|
| CN | 1853044 A | 10/2006 |
| GB | 2464956 A | 5/2010 |

(Continued)

OTHER PUBLICATIONS

Aly et al. "Mechanical Vapor Compression Desalination Systems—A Case Study". Desalination 158 (2003) pp. 143-150.

(Continued)

*Primary Examiner* — Krishnan S Menon
(74) *Attorney, Agent, or Firm* — Lando & Anastasi, LLP

(57) ABSTRACT

The invention relates to osmotically driven membrane processes and systems and methods for recovering draw solutes in the osmotically driven membrane processes. Osmotically driven membrane processes involve the extraction of a solvent from a first solution to concentrate solute by using a second concentrated solution to draw the solvent from the first solution across a semi-permeable membrane. Draw solute recovery may be carried out by various means including with the use of a membrane device. The draw solute recovery may also include the use of multi-stage solute recovery using distillation columns and/or membranes, where the recovery may be assisted by a heat pump.

10 Claims, 16 Drawing Sheets

(56) References Cited

U.S. PATENT DOCUMENTS

| | | |
|---|---|---|
| 4,023,946 A | 5/1977 | Schwartzman |
| 4,111,759 A | 9/1978 | Didycz et al. |
| 4,152,901 A | 5/1979 | Munters |
| 4,207,183 A | 6/1980 | Herrigel |
| 4,216,820 A | 8/1980 | Andrew |
| 4,316,774 A | 2/1982 | Trusch |
| 4,350,571 A | 9/1982 | Erickson |
| 4,357,153 A | 11/1982 | Erickson |
| 4,476,024 A | 10/1984 | Cheng |
| 4,525,244 A | 6/1985 | Gourlia et al. |
| 4,539,076 A | 9/1985 | Swain |
| 4,585,523 A | 4/1986 | Giddings |
| 4,618,429 A | 10/1986 | Herrigel |
| 4,689,156 A | 8/1987 | Zibrida |
| 4,718,986 A * | 1/1988 | Comiotto et al. ............... 203/26 |
| 4,781,837 A | 11/1988 | Lefebvre |
| 4,962,270 A | 10/1990 | Feimer et al. |
| 5,000,925 A | 3/1991 | Krishnamurthy et al. |
| 5,124,004 A | 6/1992 | Grethlein et al. |
| 5,127,234 A | 7/1992 | Woods, Jr. |
| 5,300,197 A | 4/1994 | Mitani et al. |
| 5,403,490 A | 4/1995 | Desai |
| 5,501,798 A | 3/1996 | Al-Samadi et al. |
| 5,614,065 A | 3/1997 | Marker |
| 5,830,314 A | 11/1998 | Mattsson |
| 5,905,182 A | 5/1999 | Streicher et al. |
| 5,932,074 A | 8/1999 | Hoiss |
| 5,997,594 A | 12/1999 | Edlund et al. |
| 6,273,937 B1 | 8/2001 | Schucker |
| 6,375,803 B1 | 4/2002 | Razzaghi et al. |
| 6,375,848 B1 | 4/2002 | Cote et al. |
| 6,391,205 B1 | 5/2002 | McGinnis |
| 6,551,466 B1 | 4/2003 | Kresnyak et al. |
| 6,589,395 B1 | 7/2003 | Meili |
| 6,716,355 B1 | 4/2004 | Hanemaaijer et al. |
| 6,811,905 B1 | 11/2004 | Cropley et al. |
| 6,998,053 B2 | 2/2006 | Awerbuch |
| 7,025,885 B2 | 4/2006 | Cote et al. |
| 7,459,084 B2 | 12/2008 | Baig et al. |
| 7,560,029 B2 | 7/2009 | Mc Ginnis |
| 7,608,188 B2 | 10/2009 | Cath et al. |
| 7,641,717 B2 | 1/2010 | Gal |
| 7,666,251 B2 | 2/2010 | Shah et al. |
| 7,699,961 B2 | 4/2010 | Ikeda et al. |
| 7,727,400 B2 | 6/2010 | Flynn |
| 7,771,569 B2 | 8/2010 | Yang et al. |
| 7,799,178 B2 | 9/2010 | Eddington |
| 7,827,820 B2 | 11/2010 | Weimer et al. |
| 7,867,365 B2 | 1/2011 | Brown |
| 7,879,243 B2 | 2/2011 | Al-Mayahi et al. |
| 7,914,680 B2 | 3/2011 | Cath et al. |
| 7,981,256 B2 | 7/2011 | Wegerer et al. |
| 8,021,549 B2 | 9/2011 | Kirts |
| 8,021,553 B2 | 9/2011 | Iyer |
| 8,029,671 B2 | 10/2011 | Cath et al. |
| 8,029,675 B2 | 10/2011 | Heinzl |
| 8,512,567 B2 | 8/2013 | Shapiro |
| 2004/0211725 A1 | 10/2004 | Jansen et al. |
| 2005/0145568 A1 | 7/2005 | Mc Ginnis |
| 2005/0183440 A1 | 8/2005 | Holtzapple et al. |
| 2006/0150665 A1 | 7/2006 | Weimer et al. |
| 2007/0068871 A1 | 3/2007 | Flynn |
| 2007/0278153 A1 | 12/2007 | Oriard et al. |
| 2008/0210634 A1 | 9/2008 | Thorsen et al. |
| 2009/0134004 A1 | 5/2009 | Asprey |
| 2009/0297431 A1 | 12/2009 | McGinnis et al. |
| 2009/0308727 A1 | 12/2009 | Kirts |
| 2010/0108587 A1 | 5/2010 | McGinnis |
| 2010/0155329 A1 | 6/2010 | Iyer |
| 2011/0084025 A1 | 4/2011 | Tominaga et al. |
| 2011/0132840 A1 | 6/2011 | Choi et al. |
| 2011/0155665 A1 | 6/2011 | Cohen et al. |
| 2012/0048803 A1 | 3/2012 | Shapiro |
| 2013/0001162 A1 | 1/2013 | Yangali-Quintanilla et al. |
| 2013/0056416 A1 | 3/2013 | Chen |

FOREIGN PATENT DOCUMENTS

| | | |
|---|---|---|
| JP | 53-032885 A | 3/1978 |
| JP | 57-012802 A | 1/1982 |
| JP | 06-063362 A | 3/1994 |
| JP | 2008-100219 A | 5/2008 |
| KR | 10-0697563 B1 | 3/2007 |
| KR | 2009-0029232 A | 3/2009 |
| WO | 9323150 A1 | 11/1993 |
| WO | 9535153 A2 | 12/1995 |
| WO | 9964147 A2 | 12/1999 |
| WO | 02060825 A2 | 8/2002 |
| WO | 2007146094 A2 | 12/2007 |
| WO | 2007147013 A1 | 12/2007 |
| WO | 2009155596 A2 | 12/2009 |
| WO | 2010017991 A2 | 2/2010 |
| WO | 2010127819 A1 | 11/2010 |
| WO | 2011053794 A2 | 5/2011 |

OTHER PUBLICATIONS

Darwish et al. "The Heat Recovery Thermal Vapour-Compression Desalting System: A Comparison with Other Thermal Desalination Processes". Applied Thermal Engineering vol. 16, pp. 523-537. (1996).

Khawaji et al. "Advances in Seawater Desalination Technologies". Desalination 221 (2008) pp. 47-69.

Koonaphapdeelert et al. "Solvent Distillation by Ceramic Hollow Fibre Membrane Contactors". Journal of Membrane Science vol. 314 (2008). pp. 58-66.

Lokiec et al. "The Mechanical Vapor Compression: 38 Years of Experience". IDS World Congress-Maspalonmas, Gran Canaria Spain Oct. 21-26, 2007.

Mackowiak et al. "Modelling of Combined Direct-Contact Condensation and Reactive Absorption in Packing Columns". Chemical Engineering Journal vol. 146. (2009). pp. 362-369.

Martinetti et al. "High Recovery of Concentrated RO Brines Using Forward Osmosis and Membrane Distillation". Journal of Membrane Science 331 (2009) pp. 31-39.

Olujic et al. "Augmenting Distillation by Using Membrane Based Vapor-Liquid Contactors: An Engineering View from Delft". Journal of Membrane Science vol. 350. (2010) pp. 19-31.

Prasad et al. "Dispersion-Free Solvent Extraction with Microporous Hollow-Fiber Modules". AIChE Journal vol. 34. Feb. 1988.

Puxty et al. "Comparison of the Rate of $CO_2$ Absorption into Aqueous Ammonia and Monoethanolamine". Chemical Engineering Science vol. 65. (2010). pp. 915-922.

Yang et al. "Hollow Fibers as Structured Packing for Olefin/Paraffin Separations". Journal of Membrane Science vol. 279. (2006) pp. 61-69.

Zhang et al. "Hollow Fibers as Structured Distillation Packing". Journal of Membrane Science vol. 215 (2003). pp. 185-193.

Cath et al. "Forward Osmosis: Principles, Applications, and Recent Developments". Journal of Membrane Science 281:70-97 (2006).

Khalil et al. "A Novel, Safe, and Environmentally Friendly Technology for Water Production through Recovery of Rejected Thermal Energy from Nuclear Power Plants". Proceedings of ICONE14, International Conference on Nuclear Engineering. Miami, Florida. Jul. 17-20, 2005.

McCutcheon et al. "A Novel Ammonia-Carbon Dioxide Forward (Direct) Osmosis Desalination Process". Desalination 174:1-11. 2005.

McCutcheon et al. "The Ammonia-Carbon Dioxide Forward Osmosis Desalination Process". Water Conditioning & Purification. Oct. 2006.

McGinnis et al. "Energy Requirements of Ammonia-Carbon Dioxide Forward Osmosis Desalination". Desalination 207: 370-382. 2007.

McGinnis et al. "Global Challenges in Energy and Water Supply: The Promise of Engineered Osmosis". Environ. Sci. Technol. 2008, 42, 8625-8629 (Online Dec. 1, 2008).

(56) References Cited

OTHER PUBLICATIONS

Osman et al. "Desalination/Concentration of Reverse Osmosis and Electrodialysis Brines with Membrane Distillation". Desalination and Water Treatment 24:293-301 (2010).
Ping et al. "Application of Heat Pump Distillation in Gas Separation Device". IEEE ISBN 978-1-61284-278-3; Feb. 19, 2011.
Timm et al. "Economic and Technical Tradeoffs Between Open and Closed Cycle Vapor Compression Evaporators". 8th Annual Industrial Energy Technology Conference, Houston, TX, Jun. 17, 1986.
Cath et al. Membrane Contractor Processes for Wastewater reclamation in space. Part 1. Direct osmotic concentration as pretreatment for reverse osmosis. Journal of Membrane Science 257 (2005) 85-97.
Eastern Municipal Water Disctrict Carollo Engineers. Evaluation and selection of available processes for a zero-liquid discharge system for the Perris, California ground water basin. U.S. Department of the Interior (Apr. 2008), 198 pages.
Tan, Sally. Forward Osmosis: Basic Principles, Big Impact. Yale Scientific Magazine (Spring 2007), 4 pages.

* cited by examiner

OSMOTICALLY DRIVEN MEMBRANE PROCESSES AND SYSTEMS AND METHODS FOR DRAW SOLUTE RECOVERY

CROSS-REFERENCE TO RELATED APPLICATIONS

This application is a continuation-in-part of PCT Patent Application No. PCT/US2010/054512, filed Oct. 28, 2010, the disclosure of which is hereby incorporated herein by reference in its entirety. This application also claims priority to and the benefit of U.S. Provisional Patent Application Nos. 61/385,296, filed Sep. 22, 2010; and 61/255,734, filed Oct. 28, 2009; the entire disclosures of which are hereby incorporated by reference herein in their entireties.

FIELD OF THE TECHNOLOGY

Generally, the invention relates to osmotically driven membrane processes and more particularly to draw solute recovery techniques for osmotically driven membrane processes.

BACKGROUND

In general, osmotically driven membrane processes involve two solutions separated by a semi-permeable membrane. One solution may be, for example, seawater, while the other solution is a concentrated solution that generates a concentration gradient between the seawater and the concentrated solution. This gradient draws water from the seawater across the membrane, which selectively permits water to pass, but not salts, into the concentrated solution. Gradually, the water entering the concentrated solution dilutes the solution. The solutes then need to be removed from the dilute solution to generate potable water. Traditionally, the potable water was obtained, for example, via distillation; however, the solutes were typically not recovered and recycled.

SUMMARY

The invention generally relates to osmotically driven membrane systems and methods, for example, forward osmosis (FO), pressure retarded osmosis (PRO), osmotic dilution (OD), direct osmotic concentration (DOC), and the like, and to systems and methods for draw solute recovery in the osmotically driven membrane systems/processes.

In one aspect, the invention relates to an osmotically driven membrane process in the manner of a forward osmosis separation process. The process includes the steps of introducing a first solution on a first side of a semi-permeable membrane, detecting at least one characteristic of the first solution, selecting a molar ratio for a concentrated draw solution comprising ammonia and carbon dioxide based on the at least one detected characteristic, introducing the concentrated draw solution comprising ammonia and carbon dioxide at the selected molar ratio on a second side of the semi-permeable membrane to maintain a desired osmotic concentration gradient across the semi-permeable membrane, promoting flow of at least a portion of the first solution across the semi-permeable membrane to form a second solution on the first side of the semi-permeable membrane and a dilute draw solution on the second side of the semi-permeable membrane, introducing at least a portion of the dilute draw solution to a separation operation to recover draw solutes and a solvent stream, reintroducing the draw solutes to the second side of the semi-permeable membrane to maintain the selected molar ratio of ammonia to carbon dioxide in the concentrated draw solution, and collecting the solvent stream.

In various embodiments, the separation operation includes using an absorber configured to condense the draw solutes into the concentrated draw solution. The solvent stream, dilute draw solution, or concentrated draw solution may be used as an absorbent in the absorber. Cooling may be used with the absorber. In some embodiments, the process may further include the step of compressing a gas stream resulting from separation of the draw solutes from the dilute draw solution using a gas compressor or a steam eductor driven by hydraulic pressure on an absorbing liquid stream to promote reabsorption of draw solutes into the concentrated draw solution. The process may further include the step of applying pressure on the first solution to enhance or cause flux through the semi-permeable membrane into the concentrated draw solution. The process may further include the step of selecting a concentrated draw solution having a draw solute characterized by an ability to have its removal from solution or introduction into solution enhanced by the use of a catalyst, characterized by an ability to have its removal from solution or introduction into solution enhanced by a reusable physical or chemical agent, or characterized by an ability to have its removal from solution or introduction into solution enhanced by an electric energy field, magnetic energy field or other change of environment such that susceptibility of the draw solute to separation is increased to enhance draw solute removal and reuse.

In additional embodiments, the process may further include the step of detecting a volumetric change with respect to at least one of the first solution and the concentration draw solution, and modifying a flow channel relating to the semi-permeable membrane in response to the detected change to maintain a desired flow characteristic. In other embodiments, the process may further include the step of enhancing draw solute removal or absorption using a catalyst, reagent, consumable, reusable material, electric energy field or magnetic energy field. In still other embodiments, the process may further include the step reducing process energy by using at least one of mechanical vapor recompression, thermal vapor recompression, vacuum distillation, sweep gas distillation, pervaporation and/or a closed cycle heat pump. The process may further include the step of using carbon dioxide to precipitate the draw solutes and using ammonia to reabsorb precipitate for pressure retarded osmosis. The process may further include the step of introducing a seeded slurry to the first solution. In at least one embodiment, the process may further include the step of using a super-saturation of salts in the first solution during a first operation and desaturation of salts during a second operation before return to the first operation for resaturation.

In another aspect, the invention relates to a system for osmotic extraction of a solvent from a first solution. The system includes a first chamber having an inlet fluidly connected to a source of the first solution, a second chamber having an inlet fluidly connected to a source of a concentrated draw solution comprising ammonia and carbon dioxide in a molar ratio of at least 1 to 1, a semi-permeable membrane system separating the first chamber from the second chamber, a separation system fluidly connected downstream of the second chamber and configured to receive a dilute draw solution from the second chamber and to recover draw solutes and a solvent stream, and a recycling system having an absorber configured to facilitate reintroduction of the draw solutes to the second chamber to maintain the molar ratio of ammonia to carbon dioxide in the concentrated draw solution. In one embodiment, the separation system includes a distillation column.

In some embodiments, the absorber may include a packed column. In at least one embodiment, the absorber includes a membrane contactor. The membrane contactor may be constructed and arranged to facilitate parallel flow of a cooled absorbent and series flow of draw solute gases in the membrane contactor. In some embodiments, the distillation column may include a membrane distillation apparatus. In some embodiments, the recycling system may further include a compression operation downstream of the absorber to enhance condensation of draw solute gases. In at least one embodiment, the compression operation includes a gas compressor, a steam eductor, or a liquid stream eductor. The separation operation may further include a carbon sequestration loop to absorb and desorb draw solutes, the carbon sequestration loop configured to complete absorption of draw solute gases and increase their pressure to promote their absorption into the concentrated draw solution.

In some embodiments, the semi-permeable membrane system may include a membrane module immersed in the first solution, where the concentrated draw solution flows through an interior of the membrane module. In at least one embodiment, the semi-permeable membrane system has a first flow channel associated with the first solution from which solvent is extracted, the first flow channel having a tapering geometry or a configuration of flow spacers such that an effective volume of the first flow channel decreases along a length of the first flow channel, and a second flow channel associated with the concentrated draw solution into which solvent is extracted from the first solution, the second flow channel having an expanding geometry or a configuration of flow spacers such that an effective volume of the second flow channel increases along a length of the second flow channel. In some embodiments, the semi-permeable membrane system includes a pyramidal membrane module array to accommodate a decrease in a volume of the first solution and an increase in a volume of the concentrated draw solution, the pyramidal membrane module array configured such that in a counter flow arrangement there are fewer membrane modules in a direction of a draw solution inlet and a feed solution outlet, and more membrane modules in a direction of a feed solution inlet and a draw solution outlet.

Furthermore, the system may include a downstream zero liquid discharge or other reduced discharge stream operation having an inlet configured to receive the concentrated solution. The system may further include a vacuum or air scouring/stripping system configured to assist in stripping draw solutes. The system may further include a pervaporation system configured to strip draw solutes. In some embodiments, the pervaporation system may have a membrane that is selective for draw solute gases relative to water vapor. The system may further include a membrane distillation system to strip draw solutes. In at least some embodiments, membranes may be used for both separation of draw solutes and heat exchange in a module. In some embodiments, the recovered draw solutes can be delivered to one or more additional downstream operations.

In another aspect, the invention relates to a method for osmotic generation of power. The method may include the steps of performing a membrane separation operation to form a first solution, precipitating draw solutes from the first solution, separating precipitated draw solutes to form a second solution, promoting production of gases from the second solution, separating the gases with a technique such as kinetic based differential absorption, and using at least one separated gas to redissolve precipitated solutes to form a third solution for reuse in the membrane separation step.

In another aspect of the invention, a forward osmosis separation process may include introducing a first solution on a first side of a semi-permeable membrane, introducing a concentrated draw solution on a second side of the semi-permeable membrane to maintain a desired osmotic concentration gradient across the semi-permeable membrane, promoting flow of at least a portion of the first solution across the semi-permeable membrane to form a second solution on the first side of the semi-permeable membrane and a dilute draw solution on the second side of the semi-permeable membrane, introducing at least a portion of the dilute draw solution to a separation operation to recover draw solutes and a solvent stream, reintroducing the draw solutes to the second side of the semi-permeable membrane to maintain a desired molar ratio in the concentrated draw solution, and collecting the solvent stream. In one or more embodiments, the recovered draw solutes from the separation operation are brought into contact with an absorbing solution.

In another aspect of the invention, an apparatus for osmotic extraction of a solvent from a first solution may include a first chamber having an inlet fluidly connected to a source of a first solution, a second chamber having an inlet fluidly connected to a source of a concentrated draw solution, a semi-permeable membrane separating the first chamber from the second chamber, and a separation system fluidly connected downstream of the second chamber and configured to receive a dilute draw solution from the second chamber and to recover draw solutes and a solvent stream. The apparatus may also include a recovery system that includes an absorber configured to facilitate reintroduction of the draw solutes to the second chamber to maintain a desired concentration of solutes in the concentrated draw solution.

In various embodiments, at least one of the separation system and the recovery system may include a membrane device. The membrane device may be constructed and arranged to bring recovered draw solute(s) into contact with an absorbing solution. The membrane device may be further constructed and arranged to strip draw solutes from the dilute draw solution. In some embodiments, at least one of the separation and recovery systems may include a suspended liquid membrane. The separation operation may include a multi-stage solute recovery operation using, for example, column or membrane distillation. In the case of multi-stage solute recovery, the system(s) may be constructed and arranged such that material and energy streams both flow in series. In at least one embodiment, the multi-stage solute recovery operation may include at least one heat pump.

In another aspect, a method for separating solute and product solvent from a draw solution using a plurality of distillation columns may include introducing draw solution to each of at least a first distillation column and at least a second distillation column, applying thermal energy from a source of thermal energy to the first distillation column to vaporize at least a portion of the draw solution in the first distillation column, directing the vaporized portion of the draw solution from the first distillation column to the second distillation column as an energy stream such that the vaporized portion of the draw solution from the first distillation column acts as a source of thermal energy for the second distillation column to vaporize at least a portion of the draw solution in the second distillation column, and flowing both the draw solution and energy streams in series within at least the first and second distillation columns, whereby draw solution solutes and product solvent contained in the draw solution are separated in the at least first and second distillation columns. In some embodiments, the method may include assisting at least one of the first and second distillation columns with a heat pump.

In another aspect, the invention relates to an apparatus (and related method) for recovering draw solution solutes from a dilute draw solution. The apparatus includes an osmotically driven membrane system having a source of dilute draw solution that includes thermally removable solutes and a separation system in fluid communication with the osmotically driven membrane system. The separation system includes at least one membrane contactor having a first side and a second side, wherein the first side is in fluid communication with the source of dilute draw solution. In one or more embodiments, the separation system further includes a source of thermal energy in communication with the dilute draw solution for vaporizing at least a portion of draw solutes out of the dilute draw solution and a source of absorbing solution in fluid communication with the second side of the membrane contactor. At least a portion of the vaporized draw solutes pass from the first side to the second side of the membrane contactor and are absorbed by the absorbing solution.

In various embodiments, the absorbing solution is also the source of thermal energy, for example, in the form of steam. The separation system can also include a condenser in communication with the absorbing solution as it exits the at least one membrane contactor, a heat pump in communication with the membrane contactor, and/or a reboiler in communication with the heat pump and a source of water discharged by the membrane contactor. In one or more embodiments, the membrane contactor is a selective membrane that substantially inhibits the transfer of water vapor, but facilitates the transfer of vaporized draw solutes. In one embodiment, the selective membrane can be a suspended liquid membrane.

In another aspect, the invention relates to an apparatus for recovering draw solution solutes from an osmotically driven membrane system. The apparatus includes a membrane module configured for receiving a dilute draw solution from the osmotically driven membrane system and a heat pump module in fluid communication with the membrane module for providing (or assisting) a source of thermal energy to the membrane module. The membrane module can include at least one membrane system, which can be disposed in a housing. In one or more embodiments, the at least one membrane system includes at least one membrane system for stripping solutes out of the dilute draw solution (i.e., a stripping membrane) and at least one membrane system for bringing draw solution solutes into contact with an absorbing solution (i.e., an absorbing membrane). In one embodiment, the membrane system is a multi-stage solute recovery system, where multiple membrane modules are utilized with material and energy flows either in series or in parallel to suit a particular application. The membrane system(s) can include a selective membrane such as, for example, a suspended liquid membrane. In one or more embodiments, the heat pump module includes a heat pump in fluid communication with a source of vaporized draw solutes discharged by the membrane module and a reboiler in fluid communication with a source of water discharged by the membrane module.

In another aspect, the invention relates to an apparatus for recovering draw solution solutes from an osmotically driven membrane system that uses multi-stage solute recovery with multiple distillation columns and/or membrane modules. In one embodiment, the apparatus includes a first distillation column (or membrane module), a heat pump, and a second distillation column (or membrane module). The first distillation column includes a first inlet coupled to a first source of dilute draw solution (e.g., the osmotically driven membrane system) for introducing a portion of dilute draw solution into a first end of the first distillation column; a first heat transfer means coupled to the first distillation column at a second end, where the first heat transfer means has an inlet coupled to a first source of thermal energy and an outlet coupled to the first distillation column for directing thermal energy to the first distillation column to cause the dilute draw solution solutes in the first distillation column to vaporize; a first outlet for removing the vaporized dilute draw solution solutes from the first distillation column; and a second outlet for removing a bottoms product from the first distillation column. Alternatively, the first source of thermal energy can be introduced directly to the first distillation column. The heat pump is coupled to the first outlet of the first distillation column. The second distillation column includes a first inlet coupled to a second source of dilute draw solution for introducing a portion of dilute draw solution into a first end of the second distillation column; a second heat transfer means coupled to the second distillation column at a second end, where the second heat transfer means has an inlet coupled to the heat pump for receiving the vaporized dilute draw solution solutes for use as a second source of thermal energy, a first outlet coupled to the second distillation column for directing the second source of thermal energy to the second distillation column to cause the dilute draw solution solutes in the second distillation column to vaporize, and a second outlet configured to return the vaporized dilute draw solution solutes from the first distillation column condensed within the second heat transfer means to the osmotically driven membrane system; a first outlet for removing the vaporized dilute draw solution solutes from the second distillation column; and a second outlet for removing a bottoms product from the second distillation column.

In various embodiments, the apparatus includes a second heat pump coupled to the first outlet of the second distillation column and at least a third distillation column. The third distillation column includes a first inlet coupled to a third source of dilute draw solution (e.g., the osmotically driven membrane system) for introducing a portion of dilute draw solution into a first end of the third distillation column; a third heat transfer means coupled to the third distillation column at a second end, where the third heat transfer means has an inlet coupled to the second heat pump for receiving the vaporized dilute draw solution solutes for use as a third source of thermal energy for use with the third distillation column, a first outlet coupled to the third distillation column for directing the third source of thermal energy to the third distillation column to cause the dilute draw solution solutes in the third distillation chamber to vaporize, and a second outlet configured to return the vaporized dilute draw solution solutes from the second distillation column condensed within the third heat transfer means to the osmotically driven membrane system; a first outlet for removing the vaporized draw solution solutes from the third distillation column; and a second outlet for removing a bottoms product from the third distillation column. In one or more embodiments, the first outlet of the third distillation column is configured to return the vaporized dilute draw solution solutes from the third distillation column to the osmotically driven membrane system. In one embodiment, the first and second distillation columns are configured for parallel operation and the first and second sources of dilute draw solution are the osmotically driven membrane system. In another embodiment, the first and second distillation columns are configured for series operation and the second source of dilute draw solution is the bottoms product of the first distillation column.

In another aspect, the invention relates to an apparatus for recovering draw solutes from an osmotically driven membrane process. The apparatus includes an osmotically driven membrane system including a source of dilute draw solution having thermally removable solutes and a separation module in fluid communication with the osmotically driven membrane system. The separation module includes at least one of a membrane device or a distillation apparatus in fluid communication with the source of dilute draw solution and at least one heat pump coupled to the at least one of a membrane device or a distillation apparatus. The heat pump is configured to provide a source of thermal energy (or assist an existing source of thermal energy) to the at least one of a membrane device or a distillation apparatus to vaporize the thermally removable solutes.

In various embodiments, the membrane device includes at least one membrane contactor configured to at least one of bring vaporized draw solutes in contact with an absorbing solution or strip draw solutes from the dilute draw solution. In one or more embodiments, the membrane contactor is a suspended liquid membrane. In one or more embodiments, the distillation apparatus includes a multi-stage solute recovery apparatus, for example, multi-stage column and/or membrane distillation apparatus. In one embodiment, the multi-stage recovery apparatus is constructed and arranged such that material and energy streams both flow in series, for example, through a first distillation column and a second distillation column.

In another aspect, the invention relates to a method of recovering draw solutes from an osmotically driven membrane system. The method includes the steps of providing a source of dilute draw solution from the osmotically driven membrane system, where the dilute draw solution comprises thermally removable solutes, introducing at least a portion of the dilute draw solution to a separation system, introducing a source of thermal energy to the separation system, vaporizing the dilute draw solution solutes out of the dilute draw solution, recovering the vaporized dilute draw solution solutes, and recycling the draw solution solutes from the separation system to the osmotically driven membrane system.

In one or more embodiments, the step of vaporizing the dilute draw solution solutes includes exposing the dilute draw solution solutes to the source of thermal energy via a membrane contactor to strip the solutes from the dilute draw solution. The step of recovering the vaporized draw solution solutes can include exposing the vaporized draw solution solutes to an absorbing solution via a membrane contactor. In yet other embodiments, the step of vaporizing the dilute draw solution solutes includes exposing the dilute draw solution to a multi-stage solute recovery process, for example, multi-stage column distillation. In one embodiment, the dilute draw solution and source of thermal energy flow in series through the multi-stage solute recovery process, for example, through at least a first distillation column (or membrane module) and a second distillation column (or membrane module). Additionally, the step of vaporizing the dilute draw solution solutes includes assisting the source of thermal energy with a heat pump.

These and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which.

DETAILED DESCRIPTION

Various embodiments of the invention may be used in any osmotically driven membrane process, such as FO, PRO, OD, DOC, etc. An osmotically driven membrane process for extracting a solvent from solution may generally involve exposing the solution to a first surface of a forward osmosis membrane. In some embodiments, the first solution (known as a process or feed solution) may be seawater, brackish water, wastewater, contaminated water, a process stream, or other aqueous solution. In at least one embodiment, the solvent is water; however, other embodiments may use non-aqueous solvents. A second solution (known as a draw solution) with an increased concentration of solute(s) relative to that of the first solution may be exposed to a second opposed surface of the forward osmosis membrane. Solvent, for example water, may then be drawn from the first solution through the forward osmosis membrane and into the second solution generating a solvent-enriched solution via forward osmosis.

Forward osmosis generally utilizes fluid transfer properties involving movement of solvent from a less concentrated solution to a more concentrated solution. Osmotic pressure generally promotes transport of solvent across a forward osmosis membrane from feed to draw solutions. The solvent-enriched solution, also referred to as a dilute draw solution, may be collected at a first outlet and undergo a further separation process. In some non-limiting embodiments, purified water may be produced as a product from the solvent-enriched solution. A second product stream, i.e., a depleted or concentrated process solution, may be collected at a second outlet for discharge or further treatment. The concentrated process solution may contain one or more target compounds which it may be desirable to concentrate or otherwise isolate for downstream use.

Figure 1:
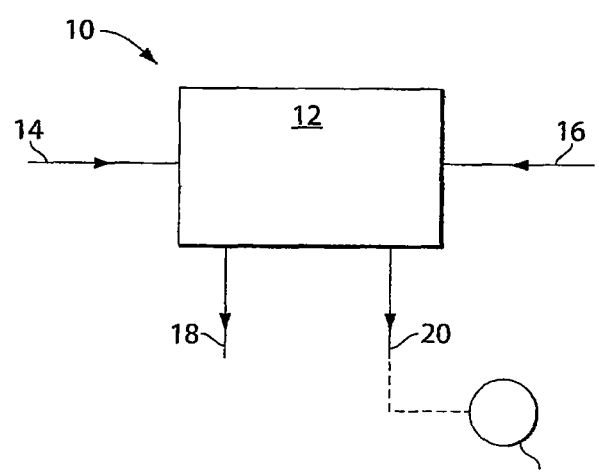
FIG. 1 is a schematic representation of an exemplary osmotically driven membrane system/process using a solute recovery system in accordance with one or more embodiments of the invention.

FIG. 1 depicts one exemplary osmotically driven membrane system/process 10 utilizing a draw solute recovery system 22 in accordance with one or more embodiments of the invention. As shown in FIG. 1, the system/process 10 includes a forward osmosis module 12, such as those described in U.S. Pat. Nos. 6,391,205 and 7,560,029; and PCT Publication Nos. WO2009/155596, and WO2011/053794; the disclosures of which are hereby incorporated by reference herein in their entireties. The module 12 is in fluid communication with a feed solution source or stream 14 and a draw solution source or stream 16. The draw solution source 16 can include, for example, a saline stream, such as sea water, or another solution as described herein that can act as an osmotic agent to dewater the feed source 14 by osmosis through a forward osmosis membrane within the module 12. The module 12 outputs a stream of concentrated solution 18 from the feed stream 14 that can be further processed. The module 12 also outputs a dilute draw solution 20 that can be further processed via the recovery system 22, as described herein, where draw solutes and a target solvent can be recovered. In accordance with one or more embodiments of the invention, the draw solutes are recovered for reuse. Various osmotically driven membrane systems/processes are described with respect to FIGS. 2-5.

Figure 2:
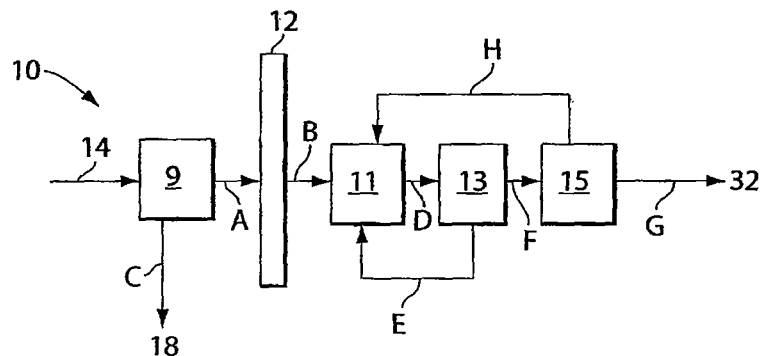
FIG. 2 is a schematic representation of an osmotically driven membrane system/process in accordance with one or more embodiments of the invention.
Figure 3:
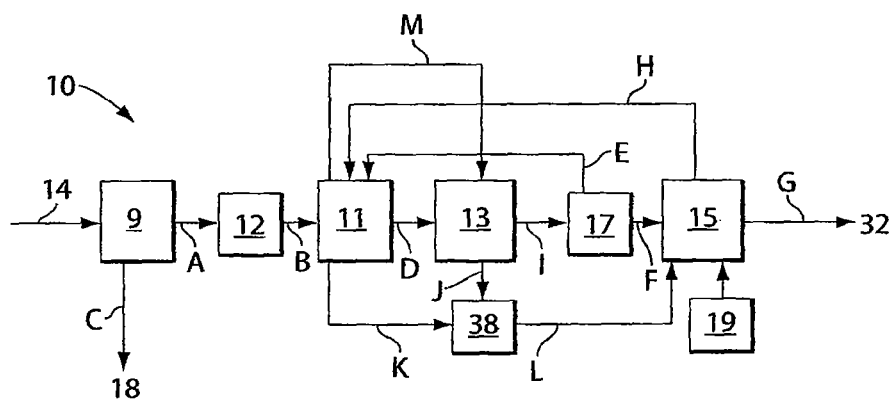
FIG. 3 is a schematic representation of an alternative osmotically driven membrane system/process in accordance with one or more embodiments of the invention.

FIGS. 2 and 3 depict osmotically driven membrane processes utilizing forward osmosis in accordance with one or more embodiments of the invention. As shown in FIG. 2, a solution 14, for example, seawater, brackish water, wastewater, contaminated water or other solution, referred to as the first solution, is introduced to or disposed in a first chamber 9. The first chamber 9 is in fluid communication with a semi-permeable membrane 12, as illustrated by arrow A. A second solution having a concentration greater than the first solution is introduced to or disposed in a second chamber 11. The higher concentration solution enables the solvent, e.g., water, from the first solution in the first chamber 9 to osmose across the semi-permeable membrane 12 into the more concentrated second solution located within the second chamber 11, as illustrated by arrow B. Having lost much of its solvent, the remaining first solution in the first chamber 9 is concentrated in solute. The solute may be discarded as illustrated by arrow C if considered a waste product. Alternatively, the solute may be a target compound and may be collected for further processing or downstream use as a desired product. The resulting solvent-enriched second solution in the second chamber 11 is then introduced, as illustrated by arrow D, into a third chamber 13. In the third chamber 13, solutes in the solvent-enriched second solution may be separated out and recycled back into second chamber 11, as illustrated by arrow E, to maintain the concentration of the second solution. The third chamber 13 and recycling operation (arrow E) are optional in one or more embodiments of the invention. The remaining solvent-enriched second solution in the third chamber 13 may then be introduced, as illustrated by arrow F, into a fourth chamber 15. In the fourth chamber 15 the remaining solvent-enriched second solution may be heated to remove any remaining solutes to produce a solvent stream, illustrated by arrow G. In some embodiments, such as those involving treatment of wastewater, the solvent stream may be purified water. In the fourth chamber 15, heat may remove any remaining solutes by breaking them down into their constituent gases, the gases may be returned to the second chamber 11, as illustrated by arrow H, to maintain the concentration gradient of the second solution in chamber 11 and act as reagent.

The forward osmosis membranes may generally be semi-permeable, for example, allowing the passage of solvent such as water, but excluding dissolved solutes therein, such as sodium chloride, ammonium carbonate, ammonium bicarbonate, ammonium carbamate, other salts, sugars, drugs or other compounds. Many types of semi-permeable membranes are suitable for this purpose provided that they are capable of allowing the passage of the solvent (e.g., water), while blocking the passage of the solutes and not reacting with the solutes in the solution. The membrane can have a variety of configurations, including thin films, hollow fiber membranes, spiral wound membranes, monofilaments and disk tubes. There are numerous well-known, commercially available semi-permeable membranes that are characterized by having pores small enough to allow water to pass while screening out solute molecules such as sodium chloride and their ionic molecular species such as chloride. Such semi-permeable membranes can be made of organic or inorganic materials. In some embodiments, membranes made of materials such as cellulose acetate, cellulose nitrate, polysulfone, polyvinylidene fluoride, polyimide and acrylonitrile co-polymers may be used. Other membranes may be mineral membranes or ceramic membranes made of materials such as $ZrO_2$ and $TiO_2$.

Generally, the material selected for use as the semi-permeable membrane should be able to withstand various process conditions to which the membrane may be subjected. For example, it may be desirable that the membrane be able to withstand elevated temperatures, such as those associated with sterilization or other high temperature processes. In some embodiments, a forward osmosis membrane module may be operated at a temperature in the range of about 0 degrees Celsius to about 100 degrees Celsius. In some non-limiting embodiments, process temperatures may range from about 40 degrees Celsius to about 50 degrees Celsius. Likewise, it may be desirable for the membrane to be able to maintain integrity under various pH conditions. For example, one or more solutions in the membrane environment, such as the draw solution, may be more or less acidic or basic. In some non-limiting embodiments, a forward osmosis membrane module may be operated at a pH level of between about 2 and about 11. In certain non-limiting embodiments, the pH level may be about 7 to about 10. The membranes used need not be made out of one of these materials and they can be composites of various materials. In at least one embodiment, the membrane may be an asymmetric membrane, such as with an active layer on a first surface, and a supporting layer on a second surface. In some embodiments, an active layer may generally be a rejecting layer. For example, a rejecting layer may block passage of salts in some non-limiting embodiments. In some embodiments, a supporting layer, such as a backing layer, may generally be inactive.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated.

In accordance with one or more embodiments, draw solutes may be recovered for reuse. Solutes may be stripped from the dilute draw solution to produce product water substantially free of the solutes. Gaseous solutes may then be condensed or absorbed to form a concentrated draw solution. An absorber may use dilute draw solution as an absorbent. In other embodiments, product water may be used as an absorbent, for all or a portion of the absorbing of the gas streams from a solute recycle system.

In accordance with one or more embodiments, a portion of the dilute draw solution may be used to absorb draw solute gases from, for example, a distillation column. In at least one embodiment, both cooling and mixing with an absorbent may occur in an absorption column or membrane module, as discussed herein. The mixing of the gases with a portion of the dilute draw solution acting as an absorbent (to then become the concentrated draw solution) may occur in a vessel. The vessel may generally be sized to provide an area large enough to facilitate interaction between the absorbent and the gases. In some embodiments, a packed column may be used as an absorber. In one or more embodiments, a stripping distillation column and an absorbing column may be used in conjunction. Heating may occur in the distillation column, while cooling and contact with the dilute draw solution absorbent may occur in the absorbing column. In one embodiment, approximately 25% of the dilute draw solution stream may be directed to an absorber to serve as an absorbent fluid, with the remaining approximately 75% of the dilute stream being directed to the stripper as its feed stream. The balance between these two streams will dictate the concentration of the reconcentrated draw solution returned to the membrane system, as well as the size of the absorber and/or stripper, as well as the quantity of heating required in the stripper and cooling required before, after, and/or within the absorber or stages of the absorber.

In accordance with one or more embodiments, it may be desirable to use low temperatures for stripping solutes in view of low temperature heat sources having low cost and few or no alternative uses. The lower the temperature of the stripping, however, the lower its pressure, and lower pressure condensation and absorption has slower kinetics, in some cases making the absorption of certain compounds, such as carbon dioxide, quite difficult. Various methods may be used to absorb remaining gases after solutes have been stripped, and some portion (typically between about 60-80%) of these have been condensed, with the remaining gases having a low tendency to continue to absorb in a short time frame.

In some embodiments, the remaining vapor stream may be compressed to raise its pressure and thereby increase the absorption kinetics. A compressor may be used. In other embodiments, a steam jet may be used in which a small portion of steam may be mixed with vapors to increase pressure to an intermediate pressure between the two streams. In still other embodiments, an absorbing solution may be pressurized and introduced into an eductor jet to entrain and compress the solute vapor (see, for example, FIGS. 16-18).

In one or more embodiments, an absorber with series flow of vapors and series or parallel flow of absorbent may be used in various configurations, using membrane contactors, packing within a column, or similar equipment. (See, for example, FIGS. 6-18). In one embodiment, series flow of vapor may be coupled with parallel flow of absorbent that has been cooled, such that no cooling need take place within the absorbing device. In other embodiments, cooling may take place in the device. A heat exchange area as well as a mass interface area may both be in a single device. Absorbent may be used to form a mixture that may be directed to join a concentrated draw solution stream. Absorbents may include dilute draw solution, product water, water with added ammonia, liquid ammonia and non-volatile carbon dioxide sequestrate which would then exit in the product water or be removed or destroyed.

In accordance with one or more embodiments, a carbon dioxide absorbing/desorbing loop may be implemented such that a solution is used as the absorbent at a low pressure to absorb carbon dioxide. The solution may then be pressurized in liquid form, and heated to desorb the carbon dioxide at a higher pressure, allowing the carbon dioxide to be absorbed in a condenser or other manner described above. In this way, some embodiments may resemble a carbon dioxide sequestration system. In some embodiments, the absorbing solution may include ammonia in water. In other embodiments, the absorbing solution may include a non-volatile solute that may complex with the carbon dioxide and then may be induced to release it, such that the solute is recycled in the absorbing system. In some embodiments, heat may be used. Catalysts and/or reagents may be used in some embodiments. The use of a catalyst or reagent in one or more processes, or in a condenser, may increase the kinetics of draw solute condensation or reabsorption.

In accordance with one or more embodiments, dilute draw solution may be directed to a stripper (see, e.g., FIG. 7), where low temperature heat causes the draw solutes to evaporate leaving a product water substantially without said solutes. A heat exchanger may be used to condense a portion of the vapors. In at least one embodiment, about 70% of the vapors may be condensed. An absorber system (see, for example, FIG. 6) may be used to introduce a portion of the remaining vapors to absorb into a dilute draw solution stream. In at least one embodiment, a second absorber system may use a concentrated ammonia solution to absorb the remaining draw solute vapors. Liquid streams exiting the condenser, and the first and second absorbers, may be mixed and used as all or part of the concentrated draw solution.

As noted above, a separation process in accordance with one or more embodiments may start with the first solution contained within the first container 12. The first solution may be an aqueous or non-aqueous solution that is being treated, either for the purpose of purified water recovery, for the removal of undesirable solutes, or for the concentration and recovery of desired solutes. Included among undesirable solutes are undesired chemically precipitable soluble salts such as sodium chloride (NaCl). Typical examples of the first solution include aqueous solutions such as seawater, brine and other saline solutions, brackish water, mineralized water, industrial waste water, and product streams associated with high purity applications, such as those affiliated with the food and pharmaceutical industries. In general, any type of solvent compatible with the draw solution may be used, for example, any solvent capable of dissolving the draw solutes. The first solution may be filtered and pre-treated in accordance with known techniques in order to remove solid and chemical wastes, biological contaminants, and otherwise prevent membrane fouling, prior to osmotic separation and is then supplied to the first chamber 9, as indicated by arrow 10.

Additionally, the first solution may be any solution containing solvent and one or more solutes for which separation, purification or other treatment is desired. In some embodiments, the first solution may be non-potable water such as seawater, salt water, brackish water, gray water, and some industrial water. It may be desired to produce purified or potable water from such a stream for downstream use. A process stream to be treated may include salts and other ionic species such as chloride, sulfate, bromide, silicate, iodide, phosphate, sodium, magnesium, calcium, potassium, nitrate, arsenic, lithium, boron, strontium, molybdenum, manganese, aluminum, cadmium, chromium, cobalt, copper, iron, lead, nickel, selenium, silver, and zinc. In some examples, the first solution may be brine, such as salt water or seawater, wastewater or other contaminated water. In other embodiments, the first solution may be a process stream containing one or more solutes, such as target species, which it is desirable to concentrate, isolate, or recover. Such streams may be from an industrial process such as a pharmaceutical or food grade application. Target species may include pharmaceuticals, salts, enzymes, proteins, catalysts, microorganisms, organic compounds, inorganic compounds, chemical precursors, chemical products, colloids, food products, or contaminants. The first solution may be delivered to a forward osmosis membrane treatment system from an upstream unit operation such as industrial facility, or any other source such as the ocean.

Like the first solution, the second solution may be an aqueous solution, i.e., the solvent is water. In other embodiments, non-aqueous solutions such as organic solvents may be used for the second solution. The second solution may be a draw solution containing a higher concentration of solute relative to the first solution. The draw solution may generally be capable of generating osmotic pressure within an osmotically driven membrane system. The osmotic pressure may be used for a variety of purposes, including desalination, water treatment, solute concentration, power generation, and other applications. A wide variety of draw solutions may be used. In some embodiments, the draw solution may include one or more removable solutes. In at least some embodiments, thermally removable (thermolytic) solutes may be used. For example, the draw solution may comprise a thermolytic salt solution. In some embodiments, an ammonia and carbon dioxide draw solution may be used, such as those disclosed in U.S. Pat. No. 7,560,029. In one embodiment, the second solution may be a concentrated solution of ammonia and carbon dioxide.

In accordance with one or more embodiments, the ratio of ammonia to carbon dioxide should substantially allow for the full absorption of the draw solution gases into the absorbing fluid, i.e., a portion of the dilute draw solution as described above, based on the highest concentration of the draw solution in the system. The concentration, volume, and flow rate of the draw solution should generally be matched to the concentration, volume, and flow rate of the feed solution, such that the desired difference in osmotic pressure between the two solutions is maintained throughout the membrane system and range of feedwater recovery. This may be calculated in accordance with one or more embodiments taking into consideration both internal and external concentration polarization phenomena in the membrane and at its surface. In one non-limiting desalination embodiment, a concentrated draw solution inlet flow rate may be used which is approximately 33% of the saline feedwater flow rate, typically in the range of about 25% to 75% for a seawater desalination system. A lower salinity feed may require draw solution inlet rates of about 5% to 25% of the feedwater flow. The dilute draw solution outlet rate may typically be about 50% to 100% of the feedwater inlet rate, and about three to four times the volume of the brine discharge.

In accordance with one or more embodiments, the ratio of ammonia to carbon dioxide should generally be matched to the concentrations of the draw solution and the temperatures used in the draw solute removal and recovery process. If the ratios are not sufficiently high, it will not be possible to completely absorb the draw solute gases into salts for reuse in the concentrated solution, and if the ratio is too high, there will be an excess of ammonia in the draw solution which will not properly condense in a desired temperature range, such as that necessary for the use of waste heat to drive the process. For example, in some embodiments a distillation column may strip gases at about 50° C. and an absorbing column may operate at about 20° C. The ratio of ammonia to carbon dioxide should further be considered to prevent the passage of ammonia into the feed solution through the membrane. If the ratio is too high, this may cause unionized ammonia to be present in higher concentrations in the draw solution (normally primarily ammonium) than are necessary or desirable. Other parameters, such as feedwater type, desired osmotic pressure, desired flux, membrane type and draw solution concentration may impact the preferred draw solution molar ratio. The ratio of ammonia to carbon dioxide may be monitored and controlled in an osmotically driven membrane process. In at least one embodiment, the draw solution may comprise ammonia and carbon dioxide in a molar ratio of greater than 1 to 1. In some non-limiting embodiments, the ratio for a draw solution at approximately 50° C., and with the molarity of the draw solution specified as the molarity of the carbon dioxide within that solution, may be at least about 1.1 to 1 for up to 1 molar draw solution, about 1.2 to 1 for up to 1.5 molar draw solution, about 1.3 to 1 for up to 3 molar draw solution, about 1.4 to 1 for up to 4 molar draw solution, about 1.5 to 1 for up to 4.5 molar draw solution, about 1.6 to 1 for up to 5 molar draw solution, about 1.7 to 1 for up to 5.5 molar draw solution, about 1.8 to 1 for up to 7 molar draw solution, about 2.0 to 1 for up to 8 molar draw solution and about 2.2 to 1 for up to 10 molar draw solution. Experiments indicate that these are approximately the minimum ratios needed for stable solubility of solutions of these concentrations at this approximate temperature. At lower temperatures, higher ratios of ammonia to carbon dioxide are required for the same concentrations. At higher temperatures, lower ratios may be required, but some pressurization of the solution may also be required to prevent decomposition of the solutes into gases. Ratios greater than 1 to 1, even at overall concentrations of less than 2 molar greatly increase the stability of the solutions and prevent evolution of carbon dioxide gas and in general thermolytic splitting of the draw solutions in response to even moderate amounts of heat and/or reduction of pressure. The draw solution generally has a concentration of solute greater than that of the feed solution. This may be achieved using solutes that are soluble enough to produce a solution that has a higher concentration than the feed solution. One or more characteristics of the draw solution may be adjusted based on the process stream supplied to the separation system for treatment. For example, the volume, flow rate, or concentration of solutes in the feed solution may impact one or more parameters selected for the draw solution. Requirements pertaining to discharge streams associated with the system may also impact one or more operational parameters. Other operational parameters may also be varied based on an intended application of the forward osmosis separation system. Preferably, the solute within the second solution should be easily removable from solution through a separation process, wherein said separation process separates the solute into at least one species that is more readily dissolved in the solvent of the solution, i.e., the soluble species, and one species that is not readily dissolved within the solvent, i.e., the less-soluble species, and the solute should pose no health risk if trace amounts remain in the resulting solvent. The existence of the soluble and less-soluble species of solutes allows for the solutions to be adjusted or manipulated as needed. Typically, the soluble and less soluble solute species reach a point in solution in which, under the particular condition temperature, pressure, pH, etc., neither species of solute is either increasing or decreasing with respect to the other, i.e., the ratio of the soluble to insoluble species of solute is static. This is referred to as equilibrium. Given the particular conditions of the solution, the species of solute need not be present in a one to one ratio at equilibrium. Through the addition of a chemical, referred to herein as a reagent, the balance between the species of solutes can be shifted. Using a first reagent, the equilibrium of the solution can be shifted to increase the amount of the soluble species of solute. Likewise, using a second reagent, the equilibrium of the solution may be shifted to increase the amount of the less-soluble solute species. After the addition of the reagents, the ratio of species of solutes may stabilize at a new level which is favored by the conditions of the solution. By manipulating the equilibrium in favor of the soluble species of solute, a second solution with a concentration near saturation can be achieved, a state in which the solutions solvent cannot dissolve anymore of the solute.

Preferred solutes for the second (draw) solution may be ammonia and carbon dioxide gases and their products, ammonium carbonate, ammonium bicarbonate, and ammonium carbamate. Ammonia and carbon dioxide, when dissolved in water at a molar ratio of about 1, form a solution comprised primarily of ammonium bicarbonate and to a lesser extent the related products ammonium carbonate and ammonium carbamate. The equilibrium in this solution favors the less-soluble species of solute, ammonium bicarbonate, over the soluble species of solute, ammonium carbamate and to a lesser extent ammonium carbonate. Buffering a solution comprised primarily of ammonium bicarbonate with an excess of ammonia so that the molar ratio of ammonia to carbon dioxide is greater than 1 will shift the equilibrium of the solution towards the more soluble species of the solute, ammonium carbamate. The ammonia is more soluble in water and is preferentially adsorbed by the solution. Because ammonium carbamate is more readily adsorbed by the solvent of the second solution, its concentration can be increased to the point where the solvent cannot adsorb anymore of the solute, i.e., saturation. In some non-limiting embodiments, the concentration of solutes within this second solution achieved by this manipulation is greater than about 2 molal, more than about 6 molal, or about 6 molal to about 12 molal.

Ammonia may be a preferred first reagent for ammonium carbamate since it is one of the chemical elements that results when the solute ammonium carbamate is decomposed, otherwise referred to as a constituent element. In general, it is preferred that the reagent for the solvent be a constituent element of the solute, as any excess reagent can easily be removed from the solution when the solvent is removed and, in a preferred embodiment, the constituent element can be recycled as the first reagent. However, other reagents that can manipulate the equilibrium of the solute species in solution are contemplated so long as the reagent is easily removed from the solution and the reagent posses no health risk if trace elements of the reagent remain within the final solvent.

In accordance with one or more embodiments, a draw solution should generally create osmotic pressure and be removable, such as for regeneration and recycle. In some embodiments, a draw solution may be characterized by an ability to undergo a catalyzed phase change in which a draw solute is changed to a gas or solid which can be precipitated from an aqueous solution using a catalyst. In some embodiments, the mechanism may be coupled with some other means, such as heating, cooling, addition of a reactant, or introduction of an electrical or magnetic field. In other embodiments, a chemical may be introduced to react with a draw solute reversibly or irreversibly to reduce its concentration, change its rejection characteristics by the membrane, or in other ways make it easier to remove. In at least one embodiment, introduction of an electrical filed may cause a change in the draw solute, such as a phase change, change in degree of ionization, or other electrically induced changes that make the solute easier to remove. In some embodiments, solute passage and/or rejection may be manipulated, such as by adjusting a pH level, adjusting the ionic nature of a solute, modifying the physical size of a solute or promoting another change that causes the draw solute to readily pass through a membrane where previously it had been rejected. For example, an ionic species may be rendered nonionic, or a large species may be made relatively smaller. In some embodiments, separation techniques not using heating, such as electrodialysis (ED), cooling, vacuum or pressurization may be implemented. In at least one embodiment, an electrical gradient may be implemented in accordance with one or more known separation techniques. In some embodiments, certain separation techniques, such as ED, may be used to reduce species to be separated such as to lower electrical requirements. In at least one embodiment, the solubility of organic species may be manipulated, such as by changing temperature, pressure, pH or other characteristic of the solution. In at least some embodiments, ion exchange separation may be implemented, such as sodium recharge ion exchange techniques, or acid and base recharged ion exchange to recycle draw solutes, including, for example, ammonium salts.

In accordance with one or more embodiments, disclosed draw solutions may be used in any osmotically driven membrane process, for example, applications involving pressure retarded osmosis, forward osmosis, or pressure assisted forward osmosis. In some embodiments, disclosed draw solutions may be used in an osmotic heat engine, such as that described in PCT Publication No. WO2008/060435, the disclosure of which is hereby incorporated by reference herein in its entirety. An osmotic heat engine may convert thermal energy into mechanical work using a semi-permeable membrane to convert osmotic pressure into electrical power. A concentrated ammonia-carbon dioxide draw solution may create high osmotic pressures which generate water flux through a semi-permeable membrane against a hydraulic pressure gradient. Depressurization of the increased draw solution volume in a turbine may produce electrical power. The process may be maintained in steady state operation through the separation of diluted draw solution into a re-concentrated draw solution and deionized water working fluid, both for reuse in the osmotic heat engine. In some embodiments involving use of disclosed draw solutions in an osmotic heat engine, efficiency may be enhanced by precipitating the draw solute. In at least one embodiment, disclosed draw solutions may be used in systems and methods for grid energy storage in which use of salinity gradients involving osmotic pressure gradients or differences between two solutions may be used to produce hydraulic pressure in a concentrated solution, allowing for the generation of power. In accordance with one or more embodiments involving distillation columns, such as the multi-stage distillation columns described in PCT Publication No. WO2007/1146094, the disclosure of which is hereby incorporated by reference herein in its entirety; dilute draw solution may be used as an absorbing fluid in a heat exchanger or absorber for heat transfer to each stage. In accordance with one or more embodiments, disclosed draw solutions may also be used in various direct osmosis concentration (DOC) applications.

Referring back to FIGS. 2-3, in accordance with one or more embodiments, the osmotically driven membrane process may begin by bringing the first solution and the second solution into contact with the first and second sides of the semi-permeable membrane 12, respectively. Although the first and second solutions can remain stagnant, it is preferred that both the first and second solutions are introduced by cross flow, i.e., flows parallel to the surface of the semi-permeable membrane 12. This increases the amount of surface area of the semi-permeable membrane 12 a given amount of the solutions comes into contact with, thereby increasing the efficiency of the forward osmosis. Since the second solution in the second chamber 11 has a higher solute concentration than the first solution in the first chamber 9, the solvent in the first solution diffuses to the second solution by forward osmosis. In some embodiments, the difference in concentration between the two solutions is so great that the solvent passes through the semi-permeable membrane 12 without the addition of pressure to the first solution. Overall, this process may result in the removal of about 50% to about 99.9% of the solvent contained within the first solution. During the separation process, the first solution becomes more concentrated as it loses solvent and the second solution becomes more diluted as it gains solvent. Despite this occurrence, the concentration gradient between the two solutions remains significant. The depleted solution on the first side of the membrane, and the diluted solution on the second side of the membrane may each be further processed for the recovery of one or more desired products. For example, the depleted solution on the first side of the membrane may contain solutes which are target species whose concentration and recovery is desired. Alternatively, the depleted solution on the first side of the membrane may be discarded as waste. Likewise, the diluted solution on the second side of the membrane may be rich in solvent which may be a desired product.

The discharge 18, i.e., the concentrated first solution, has a greater concentration of solutes. Thus, the excess solutes can be removed from the concentrated first solution prior to returning the first solution to its source or recirculating the first solution through the present method. This can be done, for example, by contacting the concentrated first solution with a solar evaporator, a mechanism of simple screen filtration, hydrocyclone, or a precipitation mass or other nucleation point to precipitate the solute. This precipitated solute may be further processed to make it suitable for consumer or industrial purposes.

Having extracted the solvent of the first solution into the second solution by forward osmosis, thereby forming a solvent-enriched second solution, it may then be desirable to remove the solutes from the solvent-enriched second solution to isolate the solvent. In some non-limiting embodiments, this can be accomplished by precipitating the solutes out of the solution, decomposing the solutes into their constituent gases that vaporize out of solution, distilling the solvent out of the solution or absorption of the solutes onto a surface. In at least one embodiment, removing a portion of the solutes by precipitation decreases the amount of energy required to heat the solution to decompose the remaining solutes, and decomposition results in the complete removal of the solutes. Potential precipitation and decomposition steps are described with reference to the third and fourth chamber 13 and 15, respectively.

The solvent-enriched second solution in the second chamber 11 may be withdrawn to a third chamber 13, as shown by arrow D. The solvent-enriched second solution may then be treated to remove a portion of the solutes from the solvent-enriched solution by precipitation. A second reagent may be introduced to adjust the equilibrium of the soluble and less-soluble solute species in favor of the less-soluble solute species. As with the first reagent, any chemical capable of adjusting the equilibrium is suitable, so long as it is easily removed from the solvent-enriched second solution and posses no health risk. Preferably the reagent is a constituent element of the solute, and in the case of the preferred solute ammonium carbamate is carbon dioxide gas. In some non-limiting embodiments, when the solvent-enriched second solution is diffused with carbon dioxide, the ratio of ammonia to carbon dioxide in solution may be reduced to around between 1 and 1.5 and the equilibrium in the solvent-enriched second solution shifts back towards the less-soluble species of solute, ammonium bicarbonate. The less-soluble species of solute may then precipitate out of solution. The precipitation of the ammonium bicarbonate may result in a substantial reduction in the concentration of solutes within the solvent-enriched second solution to about 2 to 3 molar. Preferably, the temperature of the solvent-enriched second solution in the third chamber 13 is lowered to about 18 to 25° C., preferably about 20 to 25° C. to assist in the precipitation of the solute. The precipitated solute may then be filtered from the solution.

In some embodiments, the precipitated solute may be filtered within the third chamber 13; however, in the embodiment shown in FIG. 3, the solution is directed to a filtration chamber 17, as shown by arrow I. Using well known methods, such as a hydrocyclone, a sedimentation tank, column filtration, or a simple screen filtration, the precipitated solute may be removed from the solvent-enriched solution. For example, the precipitate may be allowed to settle out of solution by gravity at which time the remaining solution may then be siphoned off. The remaining solvent-enriched second solution may be transferred from the filter chamber 17 to a fourth chamber 15, as shown by arrow F, where it is then heated to decompose the solutes into their constituent gases. In one embodiment, these constituent gases may be ammonia and carbon dioxide. The energy required for the separation process is the heat required to raise the temperature of the solution to a temperature which results in the complete removal of the ammonium carbamate solute. Additional heat is also required to make up for the inefficiency of heat transfer of the enthalpies of vaporization and solution of the solutes recycled within the process. Specifically, heating causes the remaining solutes in the solvent-enriched second solution to decompose into their constituent gases, which leave the solution. In some embodiments, a vacuum or air flow may be maintained over the solvent-enriched second solution while it is being heated in order to improve the efficiency and or lower the temperature at which the decomposition gases vaporize out of solution. By generating the air flow over the fourth chamber it may be possible to remove all of the solutes at a lower temperature than typically used. This decomposition may result in a solvent product, such as a potable water product, which may be further treated for end use. In general, a potable water product should have a pH of about 7, and further pH adjustments and or additions of desirable constituents, such as salts and or residual disinfectants, may be necessary to make the water suitable for its intended purpose.

The solvent-enriched second solution may be heated using a combination of external heat sources 19 and heat pumped through a heat exchanger 38 from the exothermic introduction of gases and solutes (arrows J and K). The external heat source 19 may be supplied by any thermal source including solar and geothermal energy. The sources may be similar to those of distillation. In some embodiments, the sources may be primarily from cogeneration environments, making use of waste heat from power generation or industrial processes. Furthermore, the process efficiency may be maintained by using a heat exchanger 38 to capture the heat released during the previous steps in the present method of desalination. As shown by the arrows J and K in FIG. 3, heat released from the chemical reactions within the second and third chambers 11, 13 may be pumped to the heat exchanger 38 that then pumps this heat to the fourth chamber 15 to assist in heating the solvent-enriched second solution, as shown by arrow L. In an alternative embodiment, additional heat is generated by allowing the constituent gases released to condense on the exterior of the chamber 15 in which the solvent-enriched second solution is being heated, thus, transferring the energy from this exothermic reaction to the fourth chamber 15. The condensate, which in one embodiment is ammonium carbamate, may then be recycled to the second solution in the second chamber 11.

It is also preferable to recycle the solutes and solute constituents removed from the second solution to limit the environmental impact and cost of the present method of forward osmosis separation. The precipitated solute discarded from a filtration chamber may be recycled to the second chamber 11, where it can dissolve in the second solution and thereby maintain the high concentration of the second solution, as shown by arrow E. Additionally, the constituent gases removed from the solvent-enriched second solution in the fourth chamber 15 can be recycled back to the second or third chambers 11, 13 as shown by arrows H and M, respectively, where they act as reagents. In one embodiment, the solute is ammonium carbamate, which is decomposed into its constituent gases: ammonia and carbon dioxide. These gases are then recycled to the second chamber 11, as shown by arrow H. Since the ammonia is more soluble than the carbon dioxide, the ammonia is preferentially adsorbed by the second solution and acts as a reagent by adjusting the equilibrium of the solute species in favor of ammonia carbamate. The remaining carbon dioxide is withdrawn from the second chamber 11, as shown by arrow M, and transferred to the third chamber 13, where it acts as a reagent and alters the equilibrium of the second solution in favor ammonium bicarbonate. Since some embodiments contemplate recycling the constituent gases derived from the decomposition of the solutes, it may be necessary to precipitate less than optimal amounts of the solutes to ensure that enough gas is recycled to maintain the efficiency of the present process. Typically, removing about half of the solutes from solution by precipitation should assure that sufficient amounts of the constituent gases will be generated to maintain the present process. The process described herein may be conducted continuously, or in batches, to better isolate the solutes from solvent throughout the process.

Figure 4:
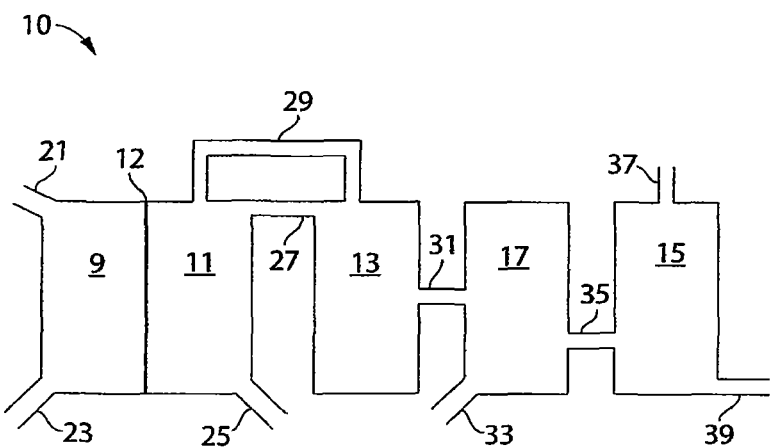
FIG. 4 is a schematic representation of another alternative osmotically driven membrane system/process in accordance with one or more embodiments of the invention.

One non-limiting embodiment of an apparatus for conducting the present method is shown in FIG. 4. The apparatus has a first chamber 9 that has an inlet 21 and an outlet 23. The inlet 21 for the first chamber 9 is in communication with a source for the first solution, such as a holding tank for a solution having undergone pre-treatment or being introduced from an upstream operation, or to a natural source for the first solution, such as the sea, a lake, a stream, or other bodies of water and waterways. The inlet 21 for the first chamber 9 may incorporate a pump in order to siphon the first solution from its source and or a screen or filter to remove particulates. It also may optionally include heating or cooling devices in order to adjust the temperature of the first solution. Similarly, the outlet 23 for the first chamber 9 may incorporate a pump in order to extract the first solution from the first chamber 9. The outlet 23 may be used to recirculate the first solution directly to the source for the first solution, although preferably, the first solution will be pumped into or across a precipitation device prior to being returned to the source of the first solution. Such a precipitation device may include a solar evaporation bed, a mechanism of simple screen filtration, a hydrocyclone, or a precipitation mass or other nucleation point operation, or other types known to those skilled in the art. The first chamber 9 is separated from a second chamber 11 by a semi-permeable membrane 12.

The second chamber 11 has an inlet 25 and first and second outlets 27, 29. The inlet 25 provides a source for the second solution and may incorporate a pump as well as a heating device. The first outlet 27 for the second chamber 11 is in communication with a third chamber 13, and provides a conduit for transferring the solvent-enriched second solution to the third chamber 13. This first outlet 27 for the second chamber 11 can incorporate a pump to withdraw the water-enriched second solution from the second chamber 11. In another embodiment of the present invention, the first outlet 27 for the second chamber 11 may incorporate a cooling device to cool the solvent-enriched second solution as discussed above. The second outlet 29 for the second chamber 11 provides a conduit for any gas remaining when gases from fourth chamber 15 are introduced into the second solution through inlet 25, which in one embodiment would be primarily carbon dioxide gas, as ammonia is expected to preferentially absorb into this solution, to be transferred to the third chamber 13.

In some embodiments, the third chamber 13 is where a portion of the solute is precipitated out of the solvent-enriched second solution. The third chamber 13, in addition to the inlets for connecting to outlets 27, 29, has an outlet 31 in communication with a filtration device 17 for separating the precipitate from the solvent-enriched second solution. The filtration device 17 is of any of the types disclosed above, and in one embodiment is a sedimentation tank. The filtration device 17 has two outlets 33, 35. The first outlet 33 may be used to dispose of the precipitated solute or return it to the second chamber 11 through the second chamber inlet 25, and the second outlet 35 may be used to transfer the remaining solvent-enriched second solution to the fourth chamber 15. In an alternate embodiment, the filtration device 17 may be incorporated into the third chamber 13, in which case the third chamber 13 will have an additional outlet, one outlet to transfer the remaining solvent-enriched second solution to the fourth chamber 15 and another outlet to dispose of the precipitated solute, or in an alternative embodiment, return the precipitated solute to the second chamber 11 through the second chamber inlet 25.

The fourth chamber 15 may incorporate a heating device for heating the remaining solvent-enriched second solution. The fourth chamber 15 also incorporates a first outlet 37, which may incorporate a vacuum, fan, or other device for generating airflow for venting the constituent gases. Preferably, the first outlet 37 for the fourth chamber 15 is in communication with the inlet 25 for the second chamber 11 to recycle the constituent gases as the second solute. The second outlet 39 acts as a conduit for withdrawing the final solvent product, such as potable or purified water.

Any materials may be used to construct the various holding and/or storage devices (chambers, vessels, and receptacles), conduits, piping, and related equipment, as long as they will withstand the weight of the solutions, and be non-reactive with any solutes within the solutions. Typical materials are non-corrosive, non-reactive materials such as stainless steel, plastic, polyvinyl chloride (PVC), fiberglass, and so forth. The vessels can take any suitable configuration, but are typically cylindrical tanks, contoured or fitted tanks, and so forth. The receptacles are typically water towers, cylindrical tanks, contoured or fitted tanks, and so forth. As discussed above, it is important to note that the chambers are shown as separate units, but the invention is not limited to that configuration, and where appropriate, any number of chambers can be contained within a single vessel, for example, partitioned into two chambers separated by the semi-permeable membrane 12.

The heating and cooling devices can be electrical heaters, refrigeration units, solar collectors, and heat exchangers such as steam condensers, circulators and so forth, such as are well known in the art, but preferably heat exchangers. The heating and cooling devices, along with any other equipment used within the process that may have power requirements, can derive their energy from any variety of commonly used sources, including, for example, waste steam, solar energy, wind or geothermal energy, and conventional sources.

Figure 5:
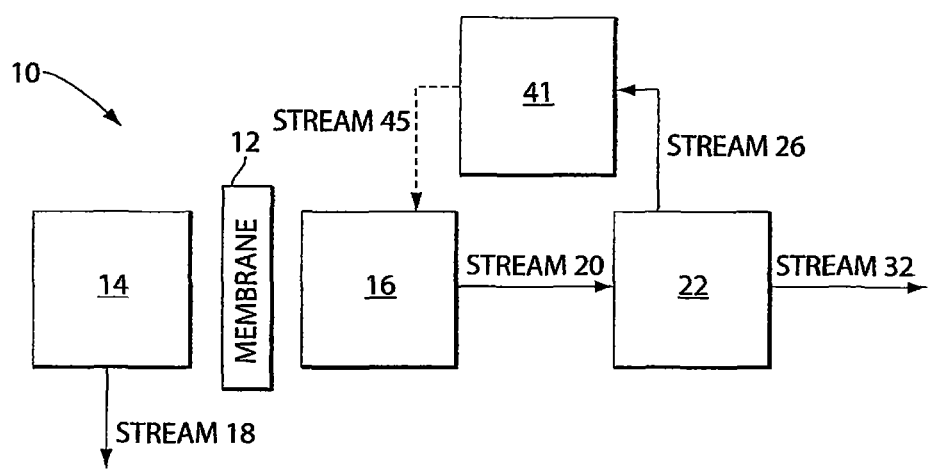
FIG. 5 is a schematic representation of another alternative osmotically driven membrane system/process in accordance with one or more embodiments of the invention.

With reference to FIG. 5, a concentration process in accordance with one or more embodiments is disclosed. A first solution 14 is exposed to one side of a forward osmosis membrane 12. In embodiments where the first solution 14 comprises a waste stream to be treated, the first solution 14 is typically aqueous and contains a solution of species, such as salts, proteins, catalysts, microorganisms, organic or inorganic chemicals, chemical precursors or products, colloids, or other constituents. In embodiments where the first solution 14 contains desired target species to be concentrated and recovered, the first solution may comprise a pharmaceutical, salt, enzyme, protein, catalyst, microorganism, organic compound, inorganic compound, chemical precursor, chemical product, colloid, food product or contaminant. The exposure of the first solution 14 to one side of the membrane 12 may be achieved in many configurations, two of which are immersion of the membrane 12 in the solution or direction of the solution past the membrane 12. This solution may be introduced continuously, in batch, once or many times, to a vessel or direction means. This input stream of the first solution 14 is not shown in the schematic.

A second solution 16 comprised, for example, of species including water, ammonia, and carbon dioxide, which is capable of generating an osmotic pressure that is higher than that of the first solution 14, is exposed to the side of the membrane opposite that exposed to the first solution 14. This exposure may be achieved by many techniques, but may include immersion of the membrane 12 in the second solution (though not if immersion is used for the first solution) or the direction of the second solution past the membrane surface. The membrane 12, being impermeable to all or some of the species of the first solution 14, such as salts, charged and/or large molecules, microorganisms, and particulate matter, but allowing the passage of the solvent, such as water, allows the difference in osmotic pressure between the first and second solutions to induce a flux of water through the membrane from the first to the second solution. This flux may be allowed to significantly, partly, or largely not dilute the second solution 16 and/or concentration the first solution 14. Some, none, few, or one of the select or target species of the first solution may also be expected to pass through the membrane 12, depending on the membrane type and/or the intention of the process use.

A portion of the solvent-enriched second solution is directed (as stream 20) to a draw solute separation operation 22, such as a distillation column, membrane distillation operation, or pervaporation operation, which causes the solutes in the solvent-enriched second solution, for example ammonia and carbon dioxide solutes, including species of ammonium salts, to be removed by adding heat to the draw solute separation operation 22 and/or applying a pressure difference to the gases above and/or produced by the draw solute separation operation. In accordance with one or more embodiments, a membrane separation method, such as pervaporation, may allow for the separation of the draw solution gases from the dilute draw solution with significant restrictions on the flow of water vapor which may increase the efficiency of the separation process. Pervaporation materials may include natural or synthetic polymers such as polyurethane or natural rubber, or suspended liquid membranes that act as passive or active selective membranes for ammonia and carbon dioxide relative to water vapor. In some embodiments, a pervaporation or similar membrane separation method may be used in place of or in conjunction with a distillation column. In at least one embodiment, an absorber column may also be implemented. In another embodiment, the gases of stream 26 are compressed to raise the temperature at which they may be reabsorbed into the draw solution completely or near completely. In accordance with one or more embodiments, an absorber may be used with cooling prior to or during reabsorption of draw solutes. In at least some embodiments, a portion of the dilute draw stream may be diverted to the absorber as an absorbent flow.

The draw solute separation operation produces a solvent stream, designated stream 32, which is reduced in concentration of the species of stream 20, either partially, substantially, or completely, and a gas stream, designated stream 26, containing the removed species from stream 20. Stream 26 is directed to an operation 41 designated to reconstitute the second solution 16, which will be used to augment, replace, or maintain the characteristics of the second solution 16, such as volume or concentration. This operation may include dissolving the species in water, a portion of the second solution, precipitation and mixing with the second solution or some other method, such that the species removed in operation 22 are reintroduced to the second solution. This reintroduction is shown as the dashed stream 45. Rejected components of solution 14 may be removed from solution 14, periodically or continuously, as water is removed from this solution. This operation may include settling, hydrocyclone separation, precipitation, force gradient (such as electrical or magnetic), blowdown, or other unit operation. This stream of components removed from solution 14 is shown as stream 18. In some embodiments, stream 18 may be a desired product stream or may be discarded as waste. By these techniques, osmotic pressure is used to remove solvent from a solution by osmotically driven flux through a semi-permeable membrane, for example separating solvent from a pharmaceutical compound, food product, or other desired species in solution, or treating a process stream by the removal of undesired solutes to produce a purified product stream. Stream 18 may additionally be treated to remove any of the draw solutes from second solution 16 that have migrated through the membrane into the first solution 14. This treatment may include distillation, air stripping, pervaporation, breakpoint chlorination, ion exchange or other means. The draw solutes removed from stream 18 may be reintroduced to the second solution 16 through mixing with stream 45 or by other means.

FIGS. 6-18 depict a variety of draw solute recovery systems 22, as introduced hereinabove, that may be used with the osmotically driven membrane systems also described herein. In accordance with one or more embodiments, the recovery system 22 can include the use of a membrane contactor, for example as described with respect to FIGS. 6-10. Using a membrane for the exchange of mass and energy between the liquid and gas streams generally performs the functions of column distillation in a membrane device. One benefit of this approach is that liquid and gas volume flows and velocities are largely independent, insofar as flooding, entrainment, foaming, and the like do not occur. In the rare case where liquid penetrates the porous membrane into the gas stream, this does not occur substantially. Additionally, density differences are not used to cause the two streams to interact, as is done with conventional distillation columns. Instead, pressure is used to cause the liquid and gas streams to flow, as would be done in pipes with liquid or gas only. For this reason, membrane based distillation devices need not be placed vertically, as is necessary for conventional distillation columns. Thus, compact, horizontal membrane arrays such as parallel modules in trains, for example, may be used to serve the function of large diameter, tall conventional distillation columns. This allows for the significant reduction in footprint and height requirements.

Moreover, the mixing of gas and liquid phases conventionally provided for by packing inside of a distillation column may now be provided by membrane area. A liquid stream may flow on one side of the membrane and the gas stream on the other side with free gas exchange between the two phases through the pores in the membrane. Coating the pores is possible if it does not inhibit gas transfer to a degree that is not compensated for by the benefits provided by the coating. The membrane may be designed to be dry or wet. In the dry membrane design, the pores of the membrane and the material of the membrane may be such that surface tension prevents water from penetrating through the pores to the gas stream. In the wet design, water may fill the pores but may not flow beyond these pores into the gas stream in significant amounts. In either case, gas exchange is substantially uninhibited.

A further benefit of using the disclosed membrane contactors for distillation is that no metal is necessary, which leads to excellent longevity for contactors in comparison to alloys, which may be very expensive and corrode over time. For instance, the presence of a few thousand ppm of NaCl in a stream that boils at 100° C. would require titanium or Hastelloy® alloys (such as those available from Haynes International, Inc. of Kokomo, Indiana), but could be served easily with a polymer (e.g., polyetheretherketone) contactor module. An additional benefit of using the disclosed membrane contactors for draw solution recovery is that the temperatures necessary for such recovery are well within the temperature tolerances of polymers that may be used in such contactors. An additional benefit is that HETPs (flow path length per theoretical equilibrium stage) may be quite small compared to conventional packing, leading to compact and less expensive contactor arrays for the same function as a much larger column. Another benefit is that much higher liquid flow rates are possible in the disclosed membrane contactors, without causing difficulties such as entrainment, leading to more effective use of membrane area, equivalent conceptually to column diameters as they relate to liquid loading rates. Another benefit is that conventional columns need additional height above and below the packing to allow for separation of the liquid and gas phases from one another, which is not necessary in the disclosed membrane contactors, as the two phases are never mixed in the same channel, and so need not be disengaged.

Figure 6:
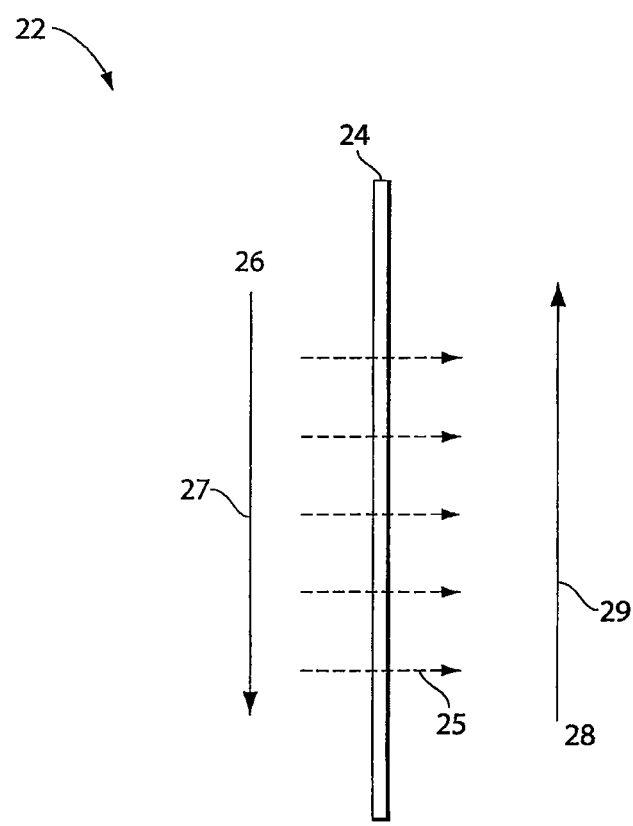
FIG. 6 is a schematic representation of a portion of a draw solute recovery system using a membrane contactor to facilitate absorption of draw solution vapors in accordance with one or more embodiments of the invention.

FIG. 6 depicts one embodiment of a draw solute recovery system 22 that uses a membrane device 24 to bring vaporized draw solutes 26 from the draw solute recovery operation into contact with an absorbing solution 28. In some embodiments, the membrane device 24 may be a membrane contactor. As shown in FIG. 6, the vaporized draw solutes 26 pass on a first side of the membrane contactor 24 (as represented by arrow 27), while the absorbing solution 28 passes on the second side of the membrane contactor 24 (as represented by arrow 29). The vaporized draw solutes are able to pass through the membrane contactor 24 (as represented by arrows 25) and be absorbed by the absorbing solution 28. In one or more embodiments, the absorbing solution 28 is a dilute or concentrated draw solution, where the vaporized draw solutes are reabsorbed to create a more concentrated source of draw solution for use/reuse in the osmotically driven membrane system/process.

Figure 7:
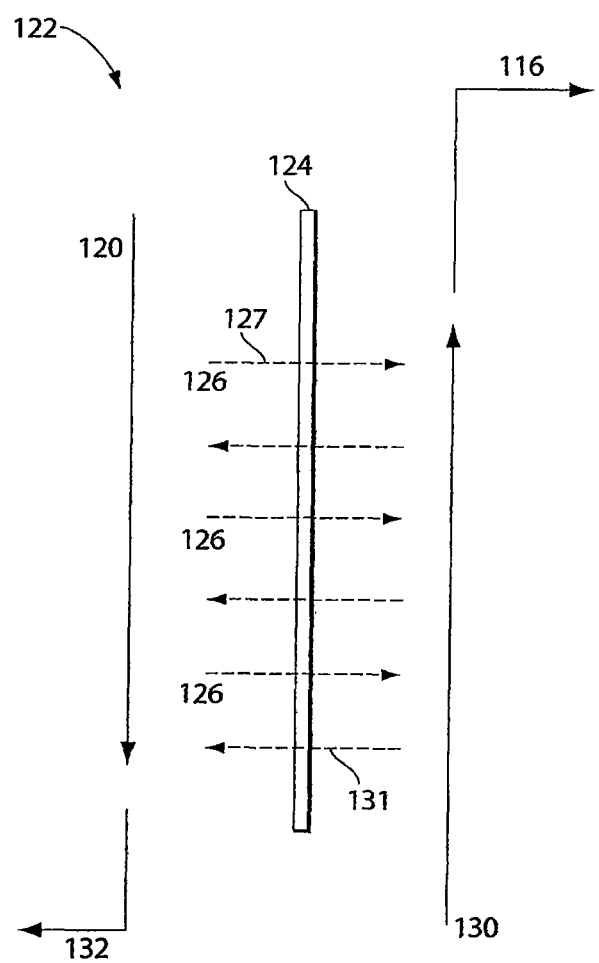
FIG. 7 is a schematic representation of a portion of a draw solute recovery system using a membrane contactor to facilitate stripping of draw solutes in accordance with one or more embodiments of the invention.

In at least one embodiment, a draw solute recovery system 122 may include the use of a stripper, as shown in FIG. 7, to remove substantially all draw solutes from a dilute draw solution. As shown in FIG. 7, the dilute draw solution 120 (from, for example, an osmotically driven membrane system) passes on one side of a membrane contactor 124, while a source of steam 130 (i.e., thermal energy) is introduced to the second side of the membrane contactor 124. The dilute draw solution 120 absorbs the heat from the steam 130 and the draw solutes are stripped therefrom. Specifically, heat from the steam 130 passes through the membrane contactor 124 (arrow 131), heating the dilute draw solution 120 and vaporizing the draw solutes therein. The vaporized draw solutes 126 pass through the membrane contactor 124 (arrow 127) and are absorbed by the steam 130, resulting in a concentrated draw solution 116 (in substantially vapor form) leaving the system 122. Stripping of the draw solutes from the dilute draw solution 120 results in a source of water 132 exiting the system 122.

Figure 9:
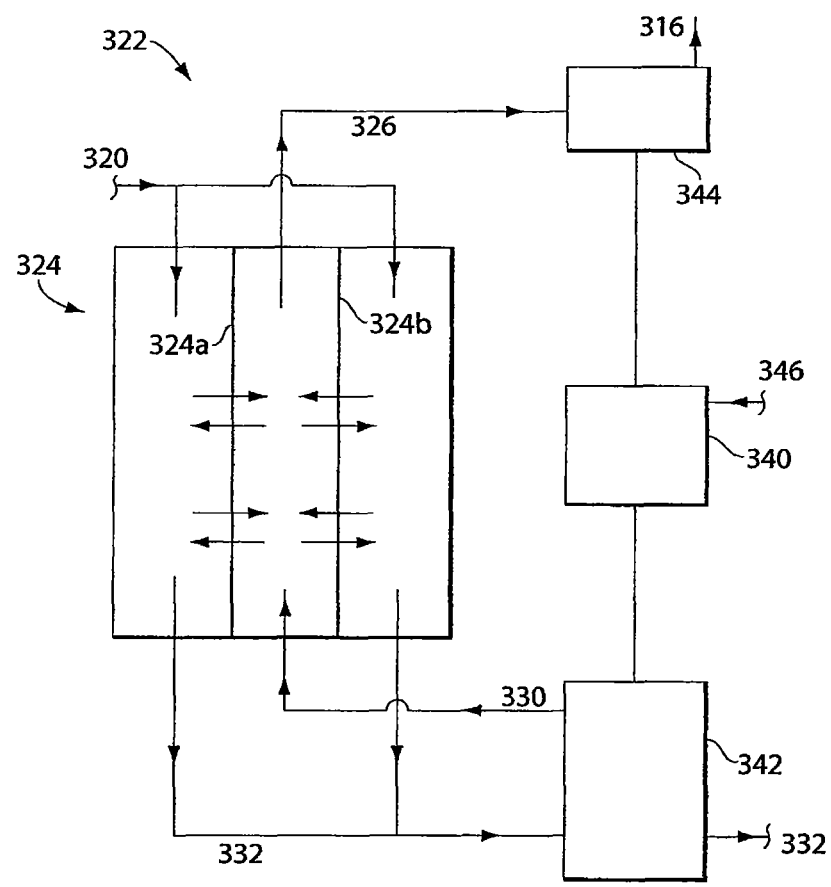
FIG. 9 is a schematic representation of a portion of a draw solute recovery system using membrane distillation integrated with a closed cycle heat pump in accordance with one or more embodiments of the invention.

Additionally or alternatively, a condenser may then be used to condense all or a portion of the vapors (see, for example, FIG. 9). A second membrane device may then be used with the remaining vapor on the first side of the membrane contactor 124 and an absorber on the second side thereof. In some embodiments, distillation with or without additional absorbing solution may be present on the second side, such that vapors may be condensed by passing through the membrane device. In some embodiments, a condenser may be positioned upstream of the membrane device. In other embodiments, the various streams may be brought into contact without an intermediate unit operation. Furthermore, a membrane absorber may fully condense vapors from a stripper or other draw solute recovery operation. In other embodiments, the membrane absorber may be used following a condenser to complete reabsorption of solutes into a more concentrated draw solution. This may be particularly useful to reduce the size of the solute recovery system. This may also be particularly useful at low temperatures and pressures.

Membranes for use in the various embodiments of the solute recovery systems can be made of essentially any material suitable for its intended purpose, including, for example, polytetrafluoroethylene (PTFE), polyvinylidene fluoride (PVDF), polyetheretherketone (PEEK), and polypropylene (PP). In accordance with various embodiments, the membrane may be porous or dense. The pores in a porous membrane may be sized so that liquid (e.g., water) does not pass through, but gases may pass through. The membrane may be in the form of hollow fibers or a flat sheet. In the case of hollow fibers, other fibers intended for heat transfer may be mixed with these fibers to enhance the ability to cool a membrane system and condense gases. For example, some fibers may be impermeable, but allow for heating or cooling of the draw solution through heat transfer at the fiber wall, while other fibers may be selective and used to separate and recycle draw solute. The percentage of each type may be varied, the longitudinal or vertical orientation of various fibers may vary, and in some embodiments the fibers may be staged in zones. Such arrangements may facilitate reduction of energy requirements in applications such as those involving an osmotic heat engine. In some embodiments, such as those involving relatively small scale applications, a collapsible mobile configuration with integrated mechanics may be implemented. In flat sheet configurations, cooling features may be integrated into a housing. In either membrane configuration, cooling may be used between membrane stages. Additionally, the membranes may be coated or uncoated to suit a particular application and may be asymmetric or symmetric. In some embodiments, hollow fiber, spiral wound or plate and frame membrane modules containing the membranes may be used.

In some embodiments, hollow fiber, spiral wound or plate and frame membrane modules containing coated or uncoated porous membranes may be used for the distillation of thermally separable draw solutions used in osmotically driven membrane processes including, power generation and/or energy storage. In accordance with one or more embodiments, heat exchange area in the form of fibers, membrane sheets, or other heat transfer materials may be integrated into membrane modules, or alternated with these modules, to enhance the ability to transfer heat, as well as mass, and to condense solute gases. The stripping and absorption functions may be integrated into a single module or spread among multiple membrane units. The stripping and absorption functions may be carried out across a single membrane. In such embodiments, stripping from the dilute draw solution by pervaporation or membrane distillation may occur on a first side, with the opposite side of the membrane system receiving the gases into solution. This may, for example, be an absorbing fluid such as a dilute or concentrated draw solution.

Figure 8:
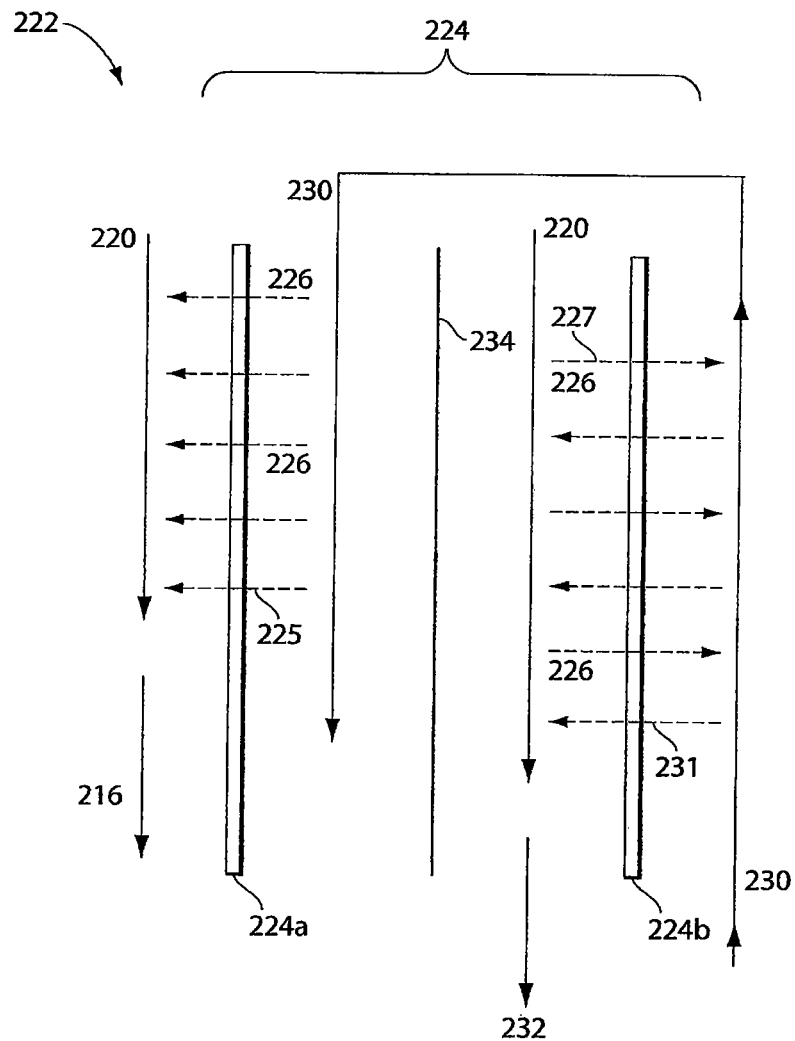
FIG. 8 is a schematic representation of a portion of a draw solute recovery system, where dilute draw solution stripping and absorbing functions are integrated into a single module.

FIG. 8 depicts one example of a recovery system 222 with dilute draw solution stripping and absorbing functions integrated into a single module or device 224. In accordance with one or more embodiments, the membrane module 224 may be designed such that stripping of draw solutes is carried out with one membrane system and absorption of gases into a draw solution to increase its concentration for reuse is carried out with a condenser and/or second membrane system. Alternatively or additionally, the stripping may be done by membrane distillation, pervaporation, or other similar process, and the absorption may be done by a membrane contactor, pervaporation process, or other similar technique.

As shown in FIG. 8, the solute recovery system 222 includes a membrane module 224 including at least one absorbing membrane 224a and at least one stripping membrane 224b. The module 224 functions similarly to the membranes described with respect to FIGS. 6 and 7. Specifically, steam 230 is introduced to one side of the stripper membrane 224b, while a dilute draw solution 220 is introduced to the other side of the stripper membrane 224b. Heat is transferred to the dilute draw solution 220 (arrow 231), vaporizing the draw solutes, which pass through the membrane 224b (arrow 227), leaving water 232 to exit the module 224. The steam 230, now including the vaporized draw solutes 226, is introduced to one side of the absorber membrane 224a, while dilute draw solution 220 is introduced to the other side of the absorber membrane, where it acts as an absorbing solution, absorbing the vaporized draw solutes 226 that pass through the membrane 224a (arrow 225), resulting in a concentrated draw solution 216 exiting the module 224. In one embodiment, the module 224 includes a blank sheet of material 234, for example, an insulator, that serves to keep the mass and/or heat from the two streams from interacting with one another.

In accordance with additional embodiments, the membrane based solute recovery systems can be integrated with a heat pump, offering significant energy efficiency improvements, as shown in FIG. 9. In particular, FIG. 9 depicts a solute recovery system 322 that includes a membrane module 324 coupled to a closed-cycle heat pump 340 with a reboiler 342 and a condenser 344. The operation of the membrane module 324 is similar to those previously described, insofar as steam 330 is introduced to the module 324 (in this case from the reboiler 342) between two membrane contactors 324a, 324b, while dilute draw solution 320 is introduced to the opposite sides of those membrane contactors 324a, 324b. Any number and arrangement of membrane contactors can be used to suit a particular application.

The steam, now containing the vaporized solutes 326, exits the module 324 and is directed to the condenser 344, where at least a portion of the steam and vaporized draw solutes 326 are condensed and discharged as concentrated draw solution 316. In some embodiments, the condenser 344 can be used with an absorbing solution. The heat pump 340, using the heat removed at the condenser 344, raises the temperature thereof and directs same to the reboiler 342 to produce the steam 330. The heat pump 340 may be coupled to a source of electricity 346 or other means of power. Water 332 is discharged by the membrane module 324 after the draw solutes have been stripped from the dilute draw solution 320. At least a portion of the water 332 can be used by the reboiler 342 to produce the additional steam 330.

Figure 10:
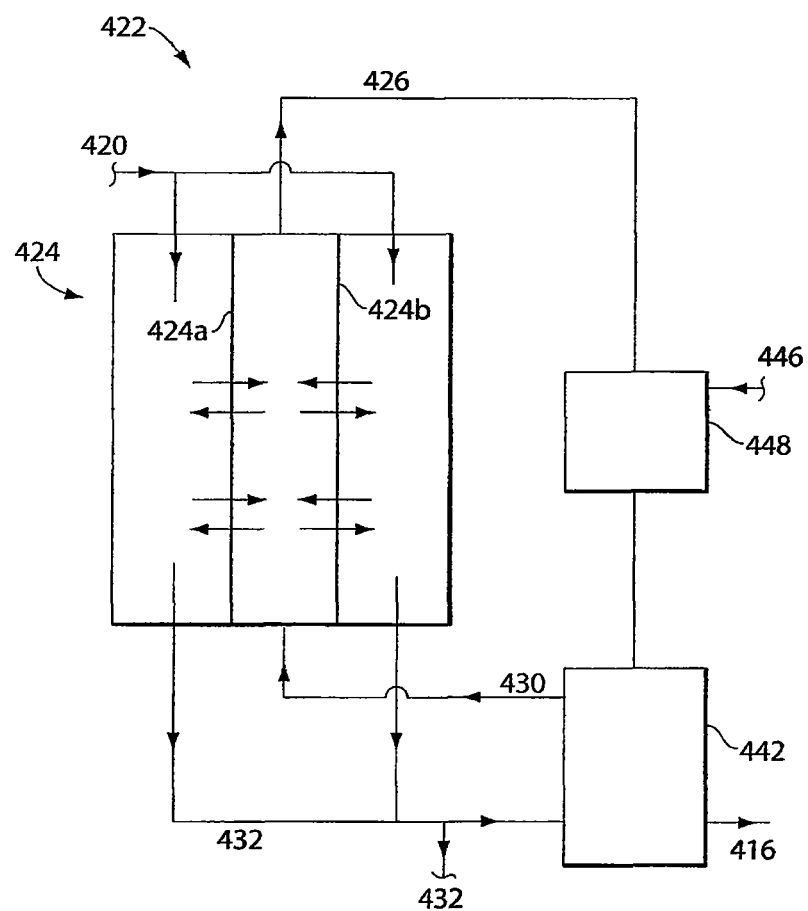
FIG. 10 is a schematic representation of a portion of a draw solute recovery system using membrane distillation integrated with an open cycle heat pump in accordance with one or more embodiments of the invention.

FIG. 10 depicts an alternative embodiment of a solute recovery system 422 that includes a membrane module 424 coupled to an open-cycle heat pump 440 and a reboiler 442. The operation of the system 422 is similar to that described with respect to FIG. 9. For example, dilute draw solution 420 is introduced to the module 424 on one side of one or more membrane contactors 424a, 424b, while steam 430 is introduced to the module 424 from the reboiler 442 on the opposite sides of the one or more membrane contactors 424a, 424b.

Again, any number and arrangement of membrane contactors can be used to suit a particular application. The vaporized draw solutes 426 exit the module 424 and are directed to the heat pump 440, where their temperature is raised and directed to the reboiler 442 to produce steam 430 for the stripping operation. The reboiler 442 discharges a concentrated draw solution 416 that may be recycled back to an osmotically driven membrane system. The module 424 also discharges water 432 that can be used as is, further processed, and/or have at least a portion thereof directed to the reboiler 442.

Figure 11:
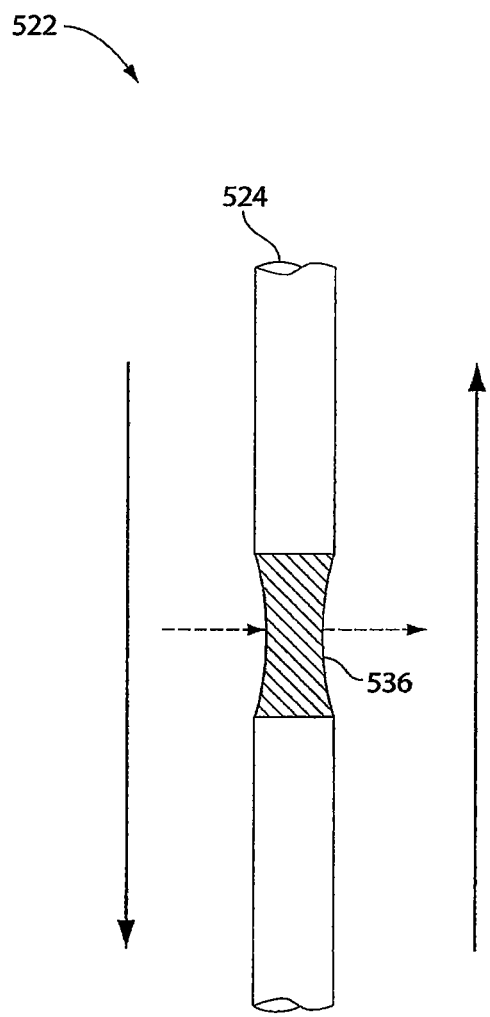
FIG. 11 is a schematic representation of a selective membrane for use in a draw solute recovery system in accordance with one or more embodiments of the invention.

FIG. 11 depicts a portion of a selective membrane 524, in the form of a suspended liquid membrane, that substantially inhibits transport of water vapor, but facilitates transport of draw solutes, either with or without carriers within the liquid. In accordance with one or more embodiments, the selective material area 536 may not be a liquid, but rather a gel or a solid, or comprise most or all of the membrane, rather than being contained within another material. Generally, selective membranes may be used for draw solute recovery, for example, a suspended liquid membrane may be used for the recycling of draw solution, where the liquid, gel, polymer or other material may be largely impermeable to water, but permeable to $NH_3$ and $CO_2$. In other embodiments, it may contain "carriers" that transport $NH_3$ and/or $CO_2$. One example would be a non-polar liquid that allows the permeation of $CO_2$, but not water or water vapor, and contains within it a carrier molecule for $NH_3$.

Figure 12:
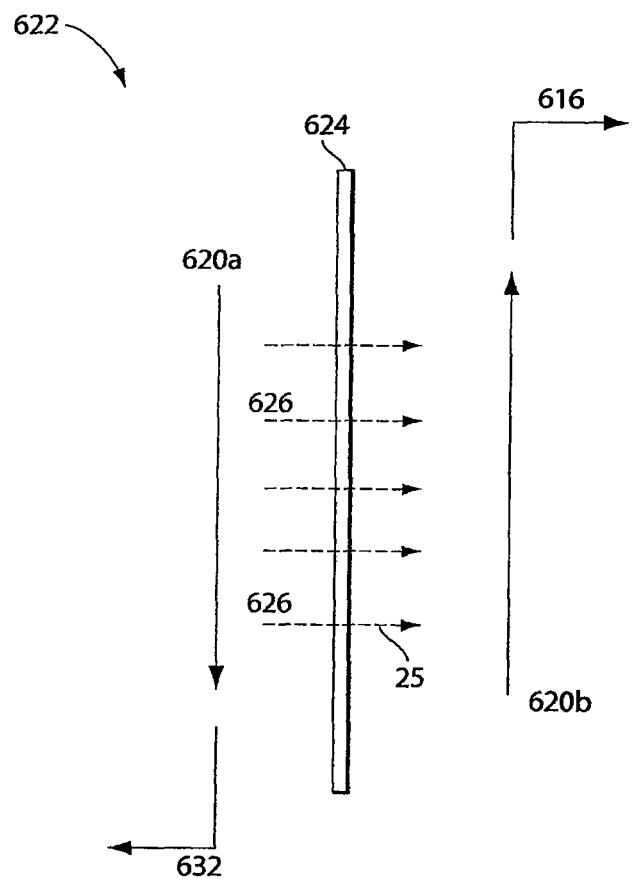
FIG. 12 is a schematic representation of a portion of a draw solute recovery system using a selective membrane for simultaneous stripping and absorption of draw solutes in accordance with one or more embodiments of the invention.

FIG. 12 depicts the use of a selective membrane 624 to facilitate simultaneous stripping and absorption of draw solutes in accordance with one or more embodiments of the invention. On one side of the membrane 624, a dilute draw solution stream 620a may be heated to thermolytically split, for example ammonium salts, and increase the vapor pressure of $NH_3$ and $CO_2$. On the other side of the membrane 624, a dilute draw solution 620b is cooled such that $NH_3$ and $CO_2$ gases 626 are absorbed within it and form ammonium salts. In this way, a dilute draw solution may be split into two streams 620a, 620b, one of which is stripped to become product water 632, and the other of which is increased in concentration to become the concentrated draw solution for reuse 616.

In accordance with one or more embodiments, a carrier-mediated, suspended liquid membrane contactor of this type would substantially decrease the amount of energy required to recycle draw solutes, as no water would be transferred as vapor as part of the separation, saving the enthalpy of vaporization of the water component of the heat duty used by conventional distillation. More broadly, this approach may apply to the recycling of any thermally separable draw solute from, for example, FO, DO, DOC, PRO, OGS (osmotic grid storage), or similar osmotically driven membrane systems, such that the suspended barrier would be relatively impermeable to water and would either transport the draw solutes, or contain carriers for the draw solutes, or some combination of the two.

Figure 13:
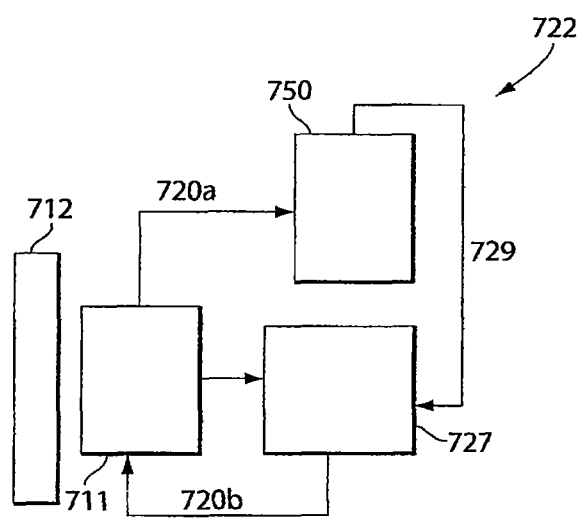
FIG. 13 is a schematic representation of a portion of a draw solute recovery system in accordance with one or more embodiments of the invention.

FIG. 13 depicts a portion of another embodiment of a draw solute recovery system 722 for use with an osmotically driven membrane process/system 710. As shown, a first portion of dilute draw solution 720a may he directed from chamber 711 of the system 710 to a distillation column 750 and a second portion of dilute draw solution 720b may be directed from chamber 711 to an absorber module 727. A stream 729 exiting the distillation column 750 may be introduced to the absorber module 727, where it is mixed with dilute draw solution 720b for return back to chamber 711 so as to reintroduce draw solutes to the draw side of a forward osmosis membrane 712.

In some embodiments, the solute recovery systems use multi-stage solute recovery systems, for example, multi-stage column distillation or membrane distillation. In multi-stage column distillation, two or more columns may receive parallel streams of dilute draw solution, each stream being treated entirely to produce product water with the desired concentration of remaining draw solutes, for example, less than about 1 ppm $NH_3$. The heat may flow between the columns in series, however, the heat consumed by the process is directed to the reboiler of the column with the highest temperature and pressure and the tops vapor from this column is condensed fully or partially on the external side of the heat transfer surfaces of the reboiler of the next column down in the temperature and pressure series. This condensation may deliver the necessary heat for the separation, fully or in part, of the second column, with this being repeated for each column in the series, until the heat rejected from cooling the tops vapor of the column with the lowest temperature and pressure is rejected to a cooling stream. The number of stages that may be used between a top and bottom temperature is generally set by the differences between condensation temperatures and reboiler temperatures of columns proximate to one another in the series, which is related to the composition of the dilute draw solution. The desired delta T of the heat exchange equipment is also an important factor. The foregoing description is similarly applicable to multi-stage membrane distillation.

Figure 14:
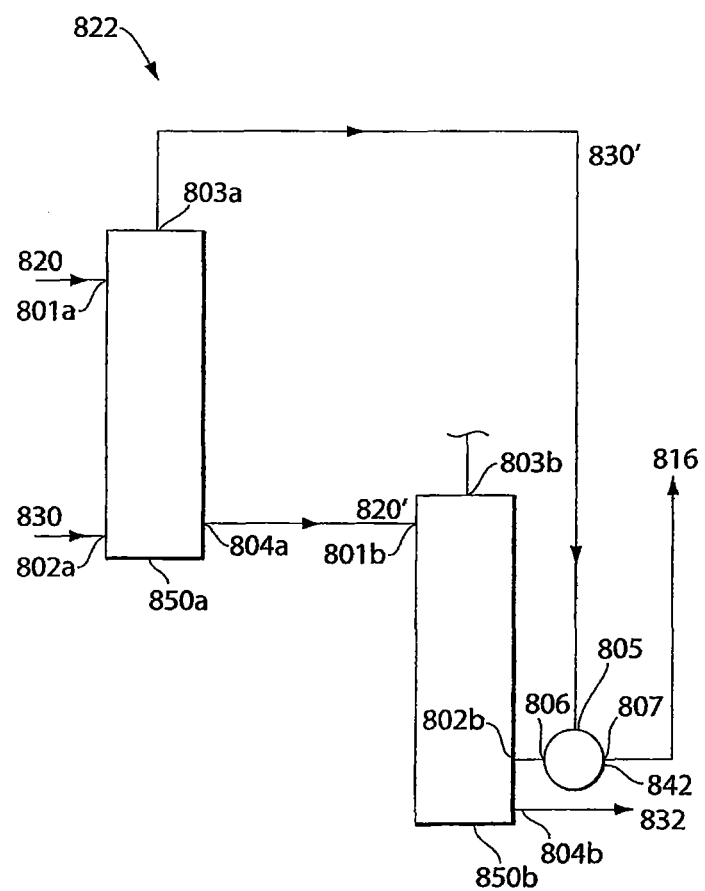
FIG. 14 is a schematic representation of a portion of a solute recovery system using multi-stage solute recovery in accordance with one or more embodiments of the invention.

FIG. 14 depicts a solute recovery system 822 that uses a multi-stage solute recovery process with both energy and material flows in series in accordance with one or more embodiments of the invention. In particular, FIG. 14 depicts a multi-stage solute recovery process that uses multi-stage column distillation; however, multi-stage membrane distillation is also contemplated and considered within the scope of the invention. As shown in FIG. 14, the material (e.g., dilute draw solution 820 from an osmotically driven membrane process) and energy (e.g., steam 830) streams may both flow in series. The dilute draw solution 820 is introduced to a first column 850a via inlet 801a, as the thermal energy 830 is introduced via a second inlet 802a, at a relatively higher temperature and pressure to reduce the concentration of the feed stream 820. The vapor 830' from the first column 850a exits via outlet 803a and may be used to provide heat to the next column 750b, which receives the first column's bottoms product 820' as its feed (via outlet 804a and inlet 801b), which is at a lower temperature and pressure. The heated vapor 830' can be introduced to the second column 850b via heat transfer means (e.g., a reboiler) 842 and inlet 805, outlet 806, and second inlet 802b. The condensed vapor is outputted as a concentrated draw solution 816 via outlet 807, while water 832 is outputted from the last column 850b via outlet 804b. This may be repeated in any number of columns until the desired bottoms composition is achieved.

This may effectively create a number of heat effects similar to embodiments disclosed in U.S. Patent Application Publication No. 2009/0297431 to McGinnis, the disclosure of which is hereby incorporated by reference herein in its entirety, where the material feeds are in parallel and the energy streams are in series. This method could be used with membrane contactors operating at different pressures, in a compact and efficient arrangement. This alternative method may be preferable for higher concentration feed streams and/or higher temperature heat sources.

In accordance with additional embodiments, the multi-stage solute recovery process may be assisted by a heat pump, offering significant energy efficiency improvements in environments where heat sources above, for example, 20° C. above ambient temperature are used. In some embodiments, a heat pump may be used when fuel combustion, higher temperature heat sources, or a back pressure turbine is used to provide heat to the draw solute recovery process.

In accordance with one or more embodiments, a heat pump, such as a thermocompressor (also known as an ejector jet), mechanical compressor (also known as a blower), absorption heat pump, closed-cycle heat pump, refrigeration style heat pump or other analogous unit may be used on one or more of the vapor streams from the columns (or membrane modules) to raise the temperature at which they partially or fully condense. By doing this, the temperature differences between stages may be reduced, allowing more stages within a given difference in temperature, or a given number of stages at lower top pressures and temperatures and/or higher bottom temperatures and pressures. This may be used to increase energy efficiency in the first case, or capital efficiency in the second case, or some combination of the two.

Figure 15:
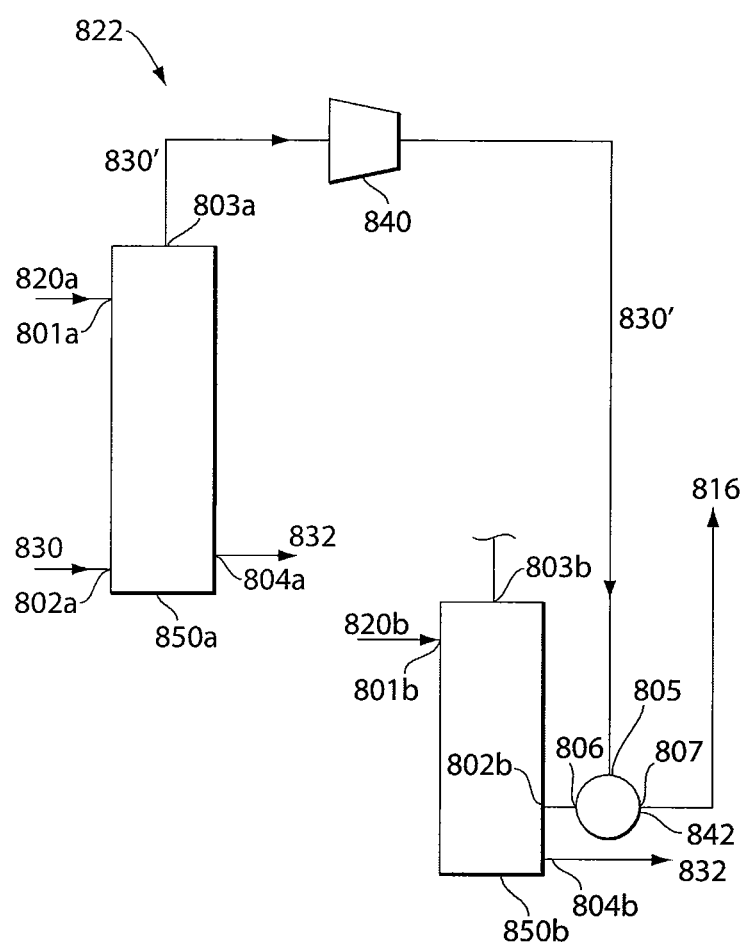
FIG. 15 is a schematic representation of a portion of a solute recovery system using heat pump assisted multi-stage solute recovery in accordance with one or more embodiments of the invention.

FIG. 15 presents a schematic of one example of heat pump assisted multi-stage solute recovery in which work is done on a tops stream with a closed or open cycle heat pump to allow for the pressures of each column (or membrane module) to be closer together, allowing for more stages and greater overall efficiency. As shown in FIG. 15, the recovery system 822, which is similar to that described with respect to FIG. 14, includes two or more distillation columns 850, where the material streams (dilute draw solution 820) are introduced (via inlets 801) to the columns 850 in parallel. A source of thermal energy (steam 830) is introduced (via inlet 802a) to the first column 850a at a relatively higher temperature and pressure to reduce the concentration of the feed stream 820a. The vapor 830' from the first column 850a is directed to the heat pump 840 (via outlet 803a), where the temperature thereof is raised, and then forwarded to the next column 850b to reduce the concentration of the second feed stream 820b. In one or more embodiments, the heated vapor 830' can be introduced via heat transfer means (e.g., a reboiler) 842, as previously described with respect to FIG. 14. The condensed vapor can be outputted as a concentrated draw solution 816 or otherwise recycled to an osmotically driven membrane system. Each column 850 outputs water 832 for use as is or further processing depending on the quality of the water 832 outputted.

In another embodiment, heat pumps of the type described above may be used with a single column (or membrane module) to fully take advantage of heat pump thermal efficiencies in the reduction of latent heat generation, in a compact and capital efficient implementation. In at least one embodiment, a heat pump may be used in the solute recovery system to reduce the energy required by the process by recycling latent heat. This may be implemented in single column/module heat pump embodiments as well.

Additional techniques for reducing the delta T required in the solute recovery and recycling system may be implemented. For example, the draw solution gases may be compressed to allow them to form the concentrated solution at a lower delta T. The desired delta T for any system might also be achieved by integrating either mechanical or absorption heat pumps.

Figure 16:
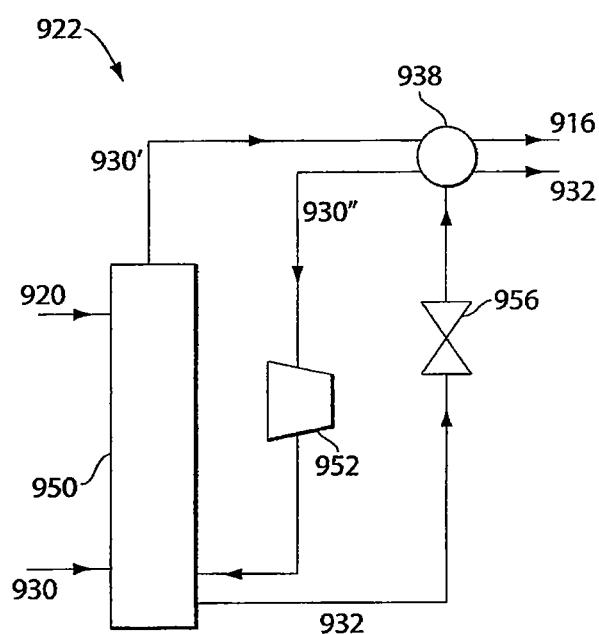
FIG. 16 is a schematic representation of a portion of a draw solute recovery system using column distillation and a heat pump in accordance with one or more embodiments of the invention.

FIG. 16 depicts one embodiment of a solute recovery system 922 that uses column distillation with a semi-open or semi-closed heat pump configuration, where a portion of the product water 932 of a column 950, with or without a reboiler, may be directed wholly or in part to a reducing valve 956, lowering its pressure, such that the water 932 may be partially or fully vaporized by heat transfer in a heat exchanger 938 from the condensing of the tops vapor 930', with or without mixed absorbent. This steam 930" produced by vaporization of product water may then be compressed by mechanical or thermojet means 952 to the point where it may be used directly as a feed to the bottom of the column 950 (or one of the previously described membrane contactor devices) for the stripping of draw solutes. For example, a column 950 operating at 230 torr may produce a tops vapor 930' that condenses on one side of a heat exchanger 938 at approximately 35-50° C., causing water 932 on the opposite side of the heat exchanger 938, which has been reduced in pressure to approximately 75-90 torr, to be turned partially to steam 930". This steam 930" may then be compressed and raised in pressure to 230 ton and injected directly into the bottom of the column or membrane module. This arrangement can be referred to as a semi-open or semi-closed heat pump configuration.

Other combinations of thermal and/or mechanical heat pumps may be employed in conjunction with multiple distillation column staging, either conventional or membrane based, so as to best balance the desire to increase the number of stages while minimizing equipment costs. These may include, for example, a thermocompressor on one or more columns, a mechanical compressor on one or more other columns, and other heat pump types on other columns, as needed, as well as integration between heat streams as might benefit an absorption heat pump implementation where heat absorbed at a low temperature may deliver a smaller quantity of heat at a higher temperature. Thermodynamic advantages of thermally regenerated, osmotically driven membrane systems over conventional systems, such as membrane distillation or mechanical vapor recompression, which may require the phase change of all water produced, may be realized to a fuller extent.

Figure 17:
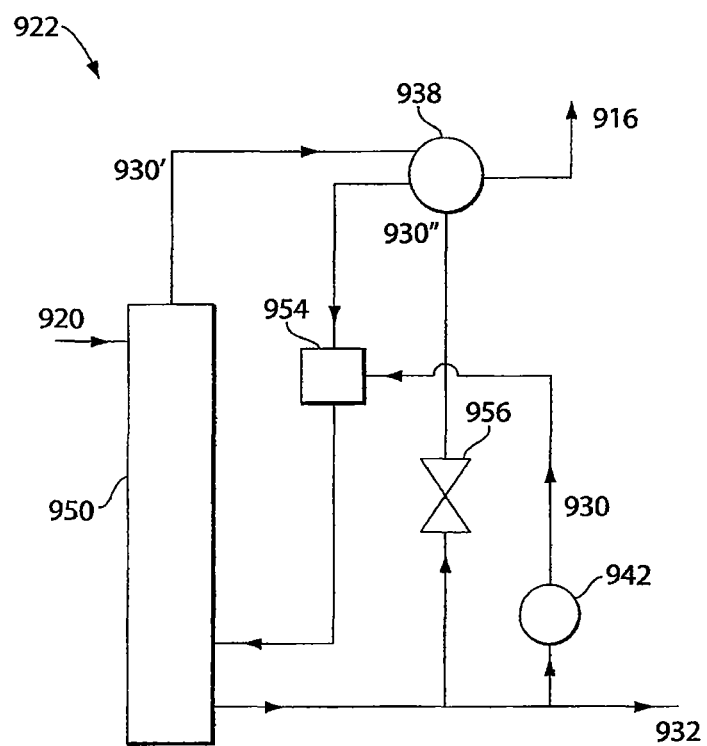
FIG. 17 is a schematic representation of a portion of a draw solute recovery system using column distillation and a heat pump in accordance with one or more embodiments of the invention.

FIG. 17 depicts an alternative embodiment, similar to FIG. 16, where a thermocompressor 954 may be used such that a portion of the product water 932 may be turned into steam directly (via boiler 942) and introduced as a relatively high pressure stream 930 used to upgrade the pressure of the vapor stream 930' from one or more of the columns 950, thereby increasing its condensation temperature. In one embodiment, the system 922 utilizes an optional heat exchanger 938 and valve 956 arrangement, similar to that described with respect to FIG. 16, to produce a vapor stream 930" for introduction to the thermocompressor 954. In this case, a net reduction in the specific heat duty may be achieved, but a lower quantity of product water may be produced. By way of non-limiting example, a 2-3 stage system (one of the stages producing a smaller portion of the separation) requiring 381 MJ/m3 of product water, may use a thermocompressor to reduce this duty to potentially as low as 200-250 MJ/m3, by allowing a 4-5 stage design.

In another alternative embodiment, a mechanical compressor may be used, such that electricity or shaft work is used to compress the vapor from the top of one or more columns, thereby increasing the temperature at which this stream condenses, allowing more stages to be used. In this case, no reduction in product water quantity would be required, but electrical energy would be needed to supplant a portion of the heat required. By way of a non-limiting example, a 2-3 stage system requiring 381 MJ/m3 of product water may use mechanical compression to reduce this duty to potentially as low as 150-200 MJ/m3, by allowing a 4-5 stage design. An additional amount of electrical energy would also be required, perhaps as much as 12.8 kW for a COP (coefficient of performance, a typical measure of heat pump efficiency) of 5. Further substitution of electrical energy for thermal energy is contemplated and considered within the scope of the invention.

Figure 18:
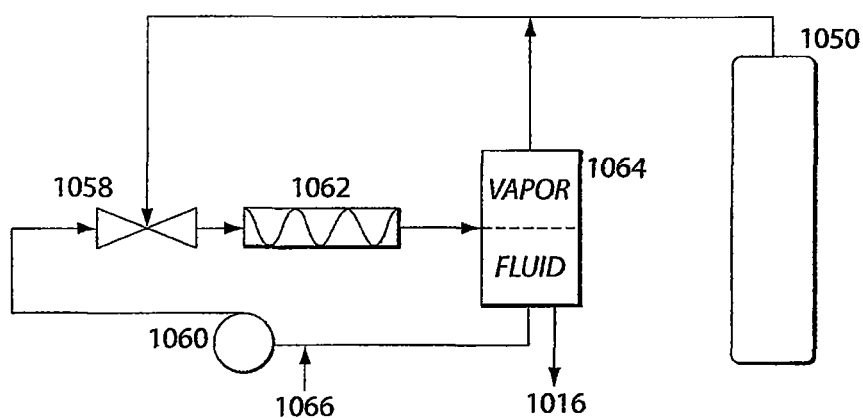
FIG. 18 is a schematic representation of a portion of a draw solute recovery system using an eductor in accordance with one or no: embodiments of the invention.

In accordance with one or more embodiments, as illustrated in FIG. 18, vacuum distillation and/or gas absorption may be integrated with the disclosed osmotically driven membrane systems. An eductor 1058, driven by a high pressure water solution (as may be assisted by a pump 1060), may be used to draw a vacuum on a distillation column 1050. The gas-water mixture exiting the eductor 1058 may flow through a static mixer 1062 to assure that the gases dissolve in the water. The water solution may then flow to a gas-liquid separator 1064, where the gas can be captured and recycled and a portion of the solution 1066 is recycled to drive the eductor.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in any claims. Further, acts, elements, and features discussed only in connection with one embodiment are not intended to be excluded from a similar role in other embodiments.

Furthermore, those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto; the invention may be practiced otherwise than as specifically described.

What is claimed is:

1. An apparatus for recovering draw solution solutes from an osmotically driven membrane system, the apparatus comprising:
   an osmotically driven membrane system comprising a semi-permeable membrane having a first side in fluid communication with a first solution and a second side in fluid communication with a source of concentrated draw solution, where the osmotically driven membrane system receives the first solution and the concentrated draw solution and outputs a concentrated first solution and a dilute draw solution;
   a first distillation apparatus in fluid communication with the second side of the semi-permeable membrane, the apparatus comprising:
      a first inlet coupled to a first source of the dilute draw solution for introducing a portion of the dilute draw solution into a first end of the first distillation apparatus;
      a first heat transfer means coupled to the first distillation apparatus at a second end, the first heat transfer means having an inlet coupled to a first source of thermal energy and an outlet coupled to the first distillation apparatus for directing thermal energy to the first distillation apparatus to cause draw solutes within the dilute draw solution in the first distillation apparatus to vaporize;
      a first outlet for removing the vaporized draw solution solutes from the first distillation apparatus; and
      a second outlet for removing a bottoms product from the first distillation apparatus;
   a compressor coupled to the first outlet of the first distillation apparatus for receiving the vaporized draw solution solutes; and
   a second distillation apparatus in fluid communication with the first side of the semi-permeable membrane and configured for parallel operation with the first distillation apparatus, the second distillation apparatus comprising:
      a first inlet coupled to a source of the concentrated first solution for introducing a portion of the concentrated first solution into a first end of the second distillation apparatus;
      a second heat transfer means coupled to the second distillation apparatus at a second end, the second heat transfer means having an inlet coupled to the compressor for receiving the compressed vaporized draw solution solutes therefrom for use as a second source of thermal energy, a first outlet coupled to the second distillation apparatus for directing the second source of thermal energy to the second distillation apparatus to cause any draw solution solutes in the second distillation apparatus to vaporize, and a second outlet configured to return the vaporized draw solution solutes from the first distillation apparatus condensed within the second heat transfer means to the osmotically driven membrane system;
      a first outlet for removing the vaporized draw solution solutes from the second distillation apparatus; and
      a second outlet for removing a bottoms product from the second distillation apparatus.

2. The apparatus of claim 1, further comprising:
   a second compressor coupled to the first outlet of the second distillation column; and
   at least a third distillation apparatus in fluid communication with the second side of the semi-permeable membrane, the apparatus comprising:
      a first inlet coupled to a second source of the dilute draw solution for introducing a portion of dilute draw solution into a first end of the third distillation column;
      a third heat transfer means coupled to the third distillation column at a second end, the third heat transfer means having an inlet coupled to the second compressor for receiving the vaporized draw solutes therefrom for use as a third source of thermal energy for use with the third distillation column, a first outlet coupled to the third distillation column for directing the third source of thermal energy to the third distillation column to cause draw solutes within the dilute draw solution in the third distillation chamber to vaporize, and a second outlet configured to return the vaporized draw solutes from the second distillation column condensed within the third heat transfer means to the osmotically driven membrane system;
      a first outlet for removing the vaporized draw solution solutes from the third distillation column; and
      a second outlet for removing a bottoms product from the third distillation column.

3. The apparatus of claim 2, wherein the first and third distillation apparatus are configured for series operation and the second source of the dilute draw solution is the bottoms product of the first distillation column.

4. The apparatus of claim 1, wherein at least one of the first distillation apparatus or the second distillation apparatus comprises a membrane distillation apparatus.

5. The apparatus of claim 1 further comprising at least one recycling system disposed downstream of at least one of the first distillation apparatus or the second distillation apparatus.

6. The apparatus of claim 5, wherein the at least one recycling system comprises at least one of a compressor or an eductor.

7. The apparatus of claim 5, wherein the at least one recycling system comprises an absorbing system.

8. The apparatus of claim 7, wherein the absorbing system comprises at least one of a membrane contactor or a packed column.

9. The apparatus of claim 7, wherein the absorbing system comprises an absorbent comprising at least one of dilute draw solution or a product solvent.

10. The apparatus of claim 7, wherein the absorbing system comprises a catalyst.

* * * * *

UNITED STATES PATENT AND TRADEMARK OFFICE
CERTIFICATE OF CORRECTION

PATENT NO. : 9,044,711 B2  Page 1 of 1
APPLICATION NO. : 13/238789
DATED : June 2, 2015
INVENTOR(S) : Robert L. McGinnis It is certified that error appears in the above-identified patent and that said Letters Patent is hereby corrected as shown below:

In the Specification:

Column 9, Line 3, delete "no:" and insert -- more --.

Column 27, Line 58, delete "he" and insert -- be --.

Column 30, Line 11, delete "ton" and insert -- torr --.

Signed and Sealed this
Tenth Day of November, 2015

Michelle K. Lee
*Director of the United States Patent and Trademark Office*